US012335105B2

(12) United States Patent
Roeland et al.

(10) Patent No.: US 12,335,105 B2
(45) Date of Patent: Jun. 17, 2025

(54) UE-ASSISTED DATA COLLECTION FOR MOBILITY PREDICTION

(71) Applicant: Telefonaktiebolaget LM Ericsson (publ), Stockholm (SE)

(72) Inventors: Dinand Roeland, Sollentuna (SE); Göran Eriksson, Norrtälje (SE); Gunnar Mildh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 478 days.

(21) Appl. No.: 17/630,956

(22) PCT Filed: Jul. 30, 2020

(86) PCT No.: PCT/IB2020/057223
§ 371 (c)(1),
(2) Date: Jan. 28, 2022

(87) PCT Pub. No.: WO2021/019498
PCT Pub. Date: Feb. 4, 2021

(65) Prior Publication Data
US 2022/0386209 A1  Dec. 1, 2022

Related U.S. Application Data

(60) Provisional application No. 62/880,464, filed on Jul. 30, 2019.

(51) Int. Cl.
*H04L 41/14* (2022.01)
*H04W 36/08* (2009.01)
*H04W 36/32* (2009.01)

(52) U.S. Cl.
CPC ............ *H04L 41/14* (2013.01); *H04W 36/08* (2013.01); *H04W 36/324* (2023.05)

(58) Field of Classification Search
CPC ..... H04W 4/029; H04W 36/32; H04W 36/08; H04W 36/00835; H04W 36/324; H04W 4/027; H04W 36/00
See application file for complete search history.

(56) References Cited

U.S. PATENT DOCUMENTS

| | | | |
|---|---|---|---|
| 6,473,411 B1 * | 10/2002 | Kumaki | H04W 36/0019 455/560 |
| 2012/0115505 A1 * | 5/2012 | Miyake | H04W 4/027 455/456.1 |

(Continued)

FOREIGN PATENT DOCUMENTS

| | | |
|---|---|---|
| CN | 104838708 A | 8/2015 |
| WO | 2020190180 A1 | 9/2020 |

OTHER PUBLICATIONS

Author Unknown, "Technical Specification Group Services and System Aspects; 5G System (5GS) Location Services (LCS) Stage 2 (Release 16)," Technical Specification 23.273, Version 16.0.0, Jun. 2019, 3GPP Organizational Partners, 86 pages.

(Continued)

*Primary Examiner* — Jeong S Park
(74) *Attorney, Agent, or Firm* — Sage Patent Group

(57) ABSTRACT

Systems and methods are disclosed herein for User Equipment (UE) assisted data collection for mobility prediction. In one embodiment, a method performed by a UE for UE-assisted data collection for mobility prediction comprises receiving, from a network node of a cellular communications system, a UE trajectory prediction model for predicting a UE trajectory. The method further comprises executing the UE trajectory prediction model to generate a predicted trajectory for the UE, comparing the actual UE trajectory to the predicted UE trajectory, and sending, to a network node of the cellular communications system, a (Continued)

result of the comparison of the actual UE trajectory to the predicted UE trajectory. In this manner, mobility prediction performance is improved.

23 Claims, 16 Drawing Sheets

(56) References Cited

U.S. PATENT DOCUMENTS

| | | | |
|---|---|---|---|
| 2013/0054604 A1 | 2/2013 | Boldyrev et al. | |
| 2013/0208696 A1* | 8/2013 | Garcia Martin | H04W 36/322 370/331 |
| 2014/0171106 A1 | 6/2014 | Cheng et al. | |
| 2014/0315583 A1* | 10/2014 | Yin | G01C 21/30 455/456.2 |
| 2015/0170032 A1* | 6/2015 | Hodes | G06F 1/1626 706/46 |
| 2015/0271641 A1* | 9/2015 | Sung | G01S 5/02 455/456.6 |
| 2015/0319668 A1* | 11/2015 | Guo | H04W 72/51 370/331 |
| 2016/0295448 A1* | 10/2016 | Cai | H04W 40/18 |
| 2019/0215739 A1* | 7/2019 | Quan | H04L 5/0053 |
| 2020/0288296 A1* | 9/2020 | Fiorese | H04L 41/0895 |
| 2020/0359395 A1 | 11/2020 | Lohmar et al. | |
| 2021/0105638 A1* | 4/2021 | Al-Kanani | H04W 24/08 |

OTHER PUBLICATIONS

Author Unknown, "Technical Specification Group Services and System Aspects; Architecture enhancements for 5G System (5GS) to support network data analytics services (Release 16)," Technical Specification 23.288, Version 16.0.0, Jun. 2019, 3GPP Organizational Partners, 52 pages.

Author Unknown, "Technical Specification Group Services and System Aspects; General Packet Radio Service (GPRS) enhancements for Evolved Universal Terrestrial Radio Access Network (E-UTRAN) access (Release 16)," Technical Specification 23.401, Version 16.3.0, Jun. 2019, 3GPP Organizational Partners, 423 pages.

Author Unknown, "Technical Specification Group Services and System Aspects; System Architecture for the 5G System; Stage 2 (Release 16)," Technical Specification 23.501, Version 16.1.0, Jun. 2019, 3GPP Organizational Partners, 368 pages.

Author Unknown, "Technical Specification Group Services and Sysem Aspects; Procedures for the 5G System; Stage 2 (Release 16)," Technical Specification 23.502, Version 16.1.0, Jun. 2019, 3GPP Organizational Partners, 500 pages.

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Technical Specification 36.300, Version 15.6.0, Jun. 2019, 3GPP Organizational Partners, 365 pages.

Motorola Mobility, et al., "S2-1812032: On UE driven analytic data," Temporary Document, 3GPP SA WG2 Meeting #129bis, Nov. 26-30, 2018, West Palm Beach, Florida, 4 pages.

Invitation to Pay Additional Fees and Partial Search for International Patent Application No. PCT/IB2020/057223, mailed Oct. 5, 2020, 37 pages.

International Search Report and Written Opinion for International Patent Application No. PCT/IB2020/057223, mailed Nov. 26, 2020, 37 pages.

Office Action dated Mar. 26, 2024 for Chinese Patent Application No. 202080068555.3, 14 pages (includes English translation).

* cited by examiner

UE-ASSISTED DATA COLLECTION FOR MOBILITY PREDICTION

RELATED APPLICATIONS

This application is a 35 U.S.C. § 371 national phase filing of International Application No. PCT/IB2020/057223, filed Jul. 30, 2020, which claims the benefit of provisional patent application Ser. No. 62/880,464, filed Jul. 30, 2019, the disclosures of which are hereby incorporated herein by reference in their entireties.

TECHNICAL FIELD

The present disclosure relates to mobility prediction in a cellular communications system.

BACKGROUND

The Third Generation Partnership Project (3GPP) Network Data Analytics Function (NWDAF) hosts several services around network data analytics. For example, a Service Function (SF) can subscribe to an NWDAF service for providing network slice congestion events. 3GPP Technical Specification (TS) 23.288 contains a list of services currently available in the NWDAF. The specification for the NWDAF is under development in 3GPP, and multiple services are expected to be added. Some of these may be standardized, some may be kept proprietary.

Ericsson Research has developed an Artificial Intelligence (AI) model in the NWDAF that can predict the next Radio Base Station (RBS) for a moving user device or User Equipment (UE). This model can for example be used to optimize paging, or to optimize selection of a User Plane Function (UPF) instance to use. For example, see International Patent Application PCT/SE2019/050235, filed Mar. 15, 2019.

A UE trajectory prediction model needs data for training and retraining. Most of this data comes from the Access Management Function (AMF) in a Fifth Generation (5G) Core (5GC) network or from a Mobility Management Entity (MME) in a Fourth Generation (4G) network, either of which has gotten its information from the UE and the Radio Access Network (RAN). This operation is illustrated in FIG. 1.

FIG. 1 illustrates the operation of a conventional NWDAF trajectory prediction service. As illustrated, an Operations, Administration, and Maintenance (OAM) node subscribes to the NWDAF's trajectory prediction service (step 100) and provides Key Performance Indicators (KPIs) as part of the subscribe request. The NWDAF then subscribes to the AMF for events (step 102). The NWDAF then sends, to the OAM, a response to the subscription request (step 104). In the example illustrated in FIG. 1, an SF also issues a request to subscribe to the NWDAF's trajectory prediction service (step 106) and receives a response to that request (step 108). This interaction is optional, and is intended to show that multiple entities may subscribe to the NWDAF's trajectory prediction service.

As UEs and other mobile devices change locations, this triggers some communications with the New Radio (NR) Base Stations (gNBs) (step 110). Some of these communications trigger the detection of an event (step 112) and generation of an event notification message (step 114) to the AMF. Notifications of these events are then sent from the AMF to the NWDAF (step 116), where each event contains information about an RBS transition of a UE. Each event includes at least a time stamp, a unique UE identifier, and an identifier of the new RBS. The event may include additional information like previous RBS and the time elapsed at the previous RBS, even though such information may also be deduced by the NWDAF from previously received events.

The NWDAF runs a service for UE trajectory prediction. This service uses events received from the AMF to perform trajectory prediction (step 118). In the example illustrated in FIG. 1, two SFs have subscribed to the NWDAF trajectory prediction service in order to regularly receive notifications about the service status or to receive actual trajectory predictions when the service is ready (steps 120, 122).

Each prediction about which RBS that the UE will go to next will have a calculated accuracy. Prediction accuracy can be calculated or measure by comparing the predictions (e.g., the predicted trajectory) with the information in the transition events coming from the AMF (e.g., the actual trajectory). A typical KPI is the percentage of transitions that was predicted correctly. This KPI will vary over time. When the model is still untrained performance will be low. But for various reasons the KPIs of an already trained model may also vary over time. For example, when too little retraining data is provided. In our use case, too little data is provided when too many UEs generate too few events over too long of a time period.

The present disclosure defines the prediction service to be "ready" when the prediction service's performance is above the given KPI (or KPIs). The minimum KPI is specified by the SF requesting the prediction service. In the example illustrated in FIG. 1, the OAM specifies the KPI that it requires in the subscribe message (step 100), and the SF specifies the KPI that it requires in its subscribe message (step 106). As can be seen in FIG. 1, a KPI may be provided by the OAM, by the subscriber of the service, or by both. In the latter case, the OAM may provide a minimal KPI. The subscribers are notified when the service becomes "ready" or "not ready" (steps 120-122). If a subscriber receives a notice that the service has become ready, meaning that the prediction service's performance meets the minimum requirement for that subscriber, that notice may also include a trajectory prediction.

In regard to tracking areas and idle mode, when a UE does not receive or send any data, the network instructs the UE to go into idle mode. This is a sleep mode to save battery life. In idle mode, the signaling between the UE and the network is kept to a minimum. However, the network still needs to be able to reach the UE; for example, when there is incoming downlink data towards the UE. This where the so-called paging procedure comes in. The AMF instructs the RBS where the UE was last seen to broadcast a message "UE, are you there?" If the UE does not reply, then the AMF instructs neighboring RBSs to broadcast that message. If still no reply is received, additional neighbors are asked until the UE replies.

Without any further measure, the paging procedure above is inefficient. In the worst case, all RBSs in the network send the broadcast message to find the UE. To improve efficiency, the concept of tracking areas is used. Each RBS, or even each cell of each RBS, regularly sends a broadcast message with a Tracking Area Code (TAC). Along with this code, the broadcast also includes the operator's network identity. TAC combined with network identity forms the Tracking Area Identity (TAI). Multiple cells and multiple RBSs may broadcast the same TAI. There is one unique TAI for each Tracking Area (TA). What TAI to broadcast is configured once and cannot be changed on-the-fly.

Each UE is configured with a list of TAIs. The UE receives this list from the AMF at initial registration (initial attach), and the AMF may change a UE's TAI list over time. When an idle UE moves within its TAI list, is does not need to contact the network. The only exception is that it sends an "I am still alive" message at regular intervals (typically once per hour). But when a UE moves outside its TAI list, it must contact the network to ask for an updated TAI list. These messages are known as "Tracking Area Update" (TAU) messages in 4G or "Periodic Registration Area Update" (RAU) messages in 5G. In this document, the terms "tracking area" and "registration area" are used interchangeably. See 3GPP TS 23.501 and 3GPP TS 23.401 for definitions.

When dimensioning the network, a balance needs to be found:

TAI lists spanning a large geographical area will lead to few TAU messages, but lots of paging messages.

TAI lists spanning a small geographical area will lead to few paging messages, but lots of TAU messages.

There currently exist certain challenge(s). For example, the AMF can only send a mobility event when it, in its turn, has received information from the UE via the RAN. This includes RBS handovers, TAUs/RAUs, or service requests (see 3GPP TS 23.502 section 4.2.3). For the NWDAF's UE trajectory prediction model to perform well, it is important that enough events on RBS transitions are received. This contradicts the current design of 4G/5G networks where mobility handling signaling is kept to a minimum. Under the current design, when the UE is in idle mode and moves within its tracking area list, there are no RBS handover events. The only event an idle UE initiates is the periodic TAU/RAU, which is done one per hour in a default configuration. This means that the NWDAF will not receive all RBS transitions for idle UEs. This, in its turn, will lead to a bad performance of the NWDAF trajectory model to predict the next RBS for a UE.

Thus, there is a need for systems and methods for addressing the aforementioned challenges with the conventional solution for UE trajectory prediction.

SUMMARY

Systems and methods are disclosed herein for User Equipment (UE) assisted data collection for mobility prediction. In one embodiment, a method performed by a UE for UE-assisted data collection for mobility prediction comprises receiving, from a network node of a cellular communications system, a UE trajectory prediction model for predicting a UE trajectory. The method further comprises executing the UE trajectory prediction model to generate a predicted trajectory for the UE, comparing the actual UE trajectory to the predicted trajectory for the UE, and sending, to a network node of the cellular communications system, a result of the comparison of the actual UE trajectory to the predicted trajectory for the UE. In this manner, mobility prediction performance is improved.

In one embodiment, sending the result of the comparison of the actual UE trajectory to the predicted trajectory for the UE comprises sending transition events or trajectory events. In another embodiment, sending the result of the comparison of the actual UE trajectory to the predicted trajectory for the UE comprises sending error data that describes a difference between the actual UE trajectory and the predicted trajectory for the UE. In one embodiment, the method further comprises sending the result of the comparison of the actual UE trajectory to the predicted trajectory for the UE to another UE.

In one embodiment, the method further comprises, subsequent to comparing the actual UE trajectory to the predicted trajectory for the UE, training or retraining the UE trajectory model. In one embodiment, sending the result of the comparison of the actual UE trajectory to the predicted trajectory for the UE comprises uploading the trained or retrained UE trajectory prediction model. In one embodiment, the method further comprises sending the trained or retrained UE trajectory prediction model to another UE.

In one embodiment, receiving the UE trajectory prediction model comprises receiving the UE trajectory prediction model from a Network Data Analytics Function (NWDAF). In another embodiment, receiving the UE trajectory prediction model comprises receiving the UE trajectory prediction model from a Management Data Analytics Function, a Non-Real-Time Intelligent Controller, or a Near-Real-Time Intelligent Controller.

In one embodiment, sending the result of the comparison comprises sending the result of the comparison to an NWDAF. In another embodiment, sending the result of the comparison comprises sending the result of the comparison to a Management Data Analytics Function, a Non-Real-Time Intelligent Controller, or a Near-Real-Time Intelligent Controller.

Corresponding embodiments of a UE are also disclosed. In one embodiment, a UE for UE-assisted data collection for mobility prediction is adapted to receive, from a network node of a cellular communications system, a UE trajectory prediction model for predicting a UE trajectory. The UE is further adapted to execute the UE trajectory prediction model to generate a predicted trajectory for the UE, compare the actual UE trajectory to the predicted trajectory for the UE, and send, to a network node of the cellular communications system, a result of the comparison of the actual UE trajectory to the predicted trajectory for the UE.

In another embodiment, a UE for UE-assisted data collection for mobility prediction comprises one or more transmitters, one or more receivers, and processing circuitry associated with the one or more transmitters and the one or more receivers. The processing circuitry is configured to cause the UE to receive, from a network node of a cellular communications system, a UE trajectory prediction model for predicting a UE trajectory. The processing circuitry is further configured to cause the UE to execute the UE trajectory prediction model to generate a predicted trajectory for the UE, compare the actual UE trajectory to the predicted trajectory for the UE, and send, to a network node of the cellular communications system, a result of the comparison of the actual UE trajectory to the predicted trajectory for the UE.

Embodiments of a method performed by a cellular communications system for UE-assisted data collection for mobility prediction are also disclosed. In one embodiment, a method performed by a cellular communications system for UE-assisted data collection for mobility prediction comprises downloading, to a target UE, a UE trajectory prediction model for predicting a trajectory of the target UE. The method further comprises receiving, from the target UE, information related to training or retraining the UE trajectory prediction model, and using the received information to train or retrain the UE trajectory prediction model.

In one embodiment, the method further comprises updating the UE trajectory prediction model in the target UE. In one embodiment, updating the UE trajectory prediction model in the target UE comprises downloading, to the target UE, the trained or retrained UE trajectory prediction model. In another embodiment, updating the UE trajectory prediction model in the target UE comprises downloading, to the target UE, updated parameters used by the UE trajectory prediction model in the target UE.

In one embodiment, the method further comprises identifying the target UE prior to downloading the UE trajectory prediction model to the target UE. In one embodiment, identifying the target UE comprises receiving a plurality of Radio Base Station (RBS) transition events associated with at least one UE, determining that an RBS transition event of a first UE involved a transition from a first RBS to a second RBS that is not a neighbor of the first RBS, and identifying the first UE as a target for downloading the UE trajectory prediction model.

In another embodiment, identifying the target UE comprises determining that an RBS transition event of each of a plurality of UEs involved a transition from a first RBS to a second RBS that is not a neighbor of the first RBS, identifying the plurality of UEs as potential target UEs for downloading respective UE trajectory prediction models, and selecting a subset of the potential target UEs as target UEs for downloading the respective UE trajectory prediction models, the subset of the potential target UEs including the identified target UE. In one embodiment, selecting the subset of the potential target UEs comprises selecting the subset of the potential target UEs based on at least one parameter. In one embodiment, the at least one parameter comprises: presence of a UE in a region or area where performance of the UE trajectory prediction model is below a threshold, UE class or type, UE speed, type of UE motion, UE behavior, Radio Access Technology (RAT) or frequency bands supported by the UE, and/or UE battery capacity.

In one embodiment, at least some of the steps of the method are performed by an NWDAF or an Operations, Administration, and Maintenance (OAM) node.

In one embodiment, identifying the target UE comprises receiving an identity of the target UE from an OAM node.

Corresponding embodiments of a system for UE-assisted data collection for mobility prediction are also disclosed. In one embodiment, the system comprises at least one network node for a cellular communications system. The at least one network node is adapted to download, to a target UE, a UE trajectory prediction model for predicting a trajectory of the target UE. The at least one network node is further adapted to receive, from the target UE, information related to training or retraining the UE trajectory prediction model and use the received information to train or retrain the UE trajectory prediction model.

In another embodiment, a method performed by a network node for UE-assisted data collection for mobility prediction comprises receiving a plurality of RBS transition events associated with at least one UE and identifying, based on the plurality of RBS transition events, a target UE from which to obtain information for training or retraining a respective UE trajectory prediction model.

In one embodiment, identifying the target UE comprises determining that, from among the plurality of RBS transition events, an RBS transition event of a first UE involved a transition from a first RBS to a second RBS that is not a neighbor of the first RBS and identifying the first UE as the target UE.

In one embodiment, identifying the target UE comprises determining that, from among the plurality of RBS transition events, an RBS transition event of each of a plurality of UEs involved a transition from a first RBS to a second RBS that is not a neighbor of the first RBS. Identifying the target UE further comprises identifying the plurality of UEs as potential target UEs for downloading respective UE trajectory prediction models and selecting a subset of the potential target UEs as target UEs for downloading the respective UE trajectory prediction models, the subset of the potential target UEs including the identified target UE. In one embodiment, the subset of UEs is selected based on one or more parameters. In one embodiment, the one or more parameters comprise: presence of a UE in a region or area where performance of the UE trajectory prediction model is below a threshold, UE class or type, UE speed, type of UE motion, a UE behavior, a RAT or frequency bands supported, and/or UE battery capacity.

In one embodiment, the network node comprises an NWDAF or an OAM node.

Corresponding embodiments of a network node for UE-assisted data collection for mobility prediction are also disclosed. In one embodiment, a network node for UE-assisted data collection for mobility prediction is adapted to receive a plurality of RBS transition events associated with at least one UE and identifying, based on the plurality of RBS transition events, a target UE from which to obtain information for training or retraining a respective UE trajectory prediction model.

In another embodiment, a network node for UE-assisted data collection for mobility prediction comprises processing circuitry configured to cause the network node to receive a plurality of RBS transition events associated with at least one UE and identify, based on the plurality of RBS transition events, a target UE from which to obtain information for training or retraining a respective UE trajectory prediction model.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
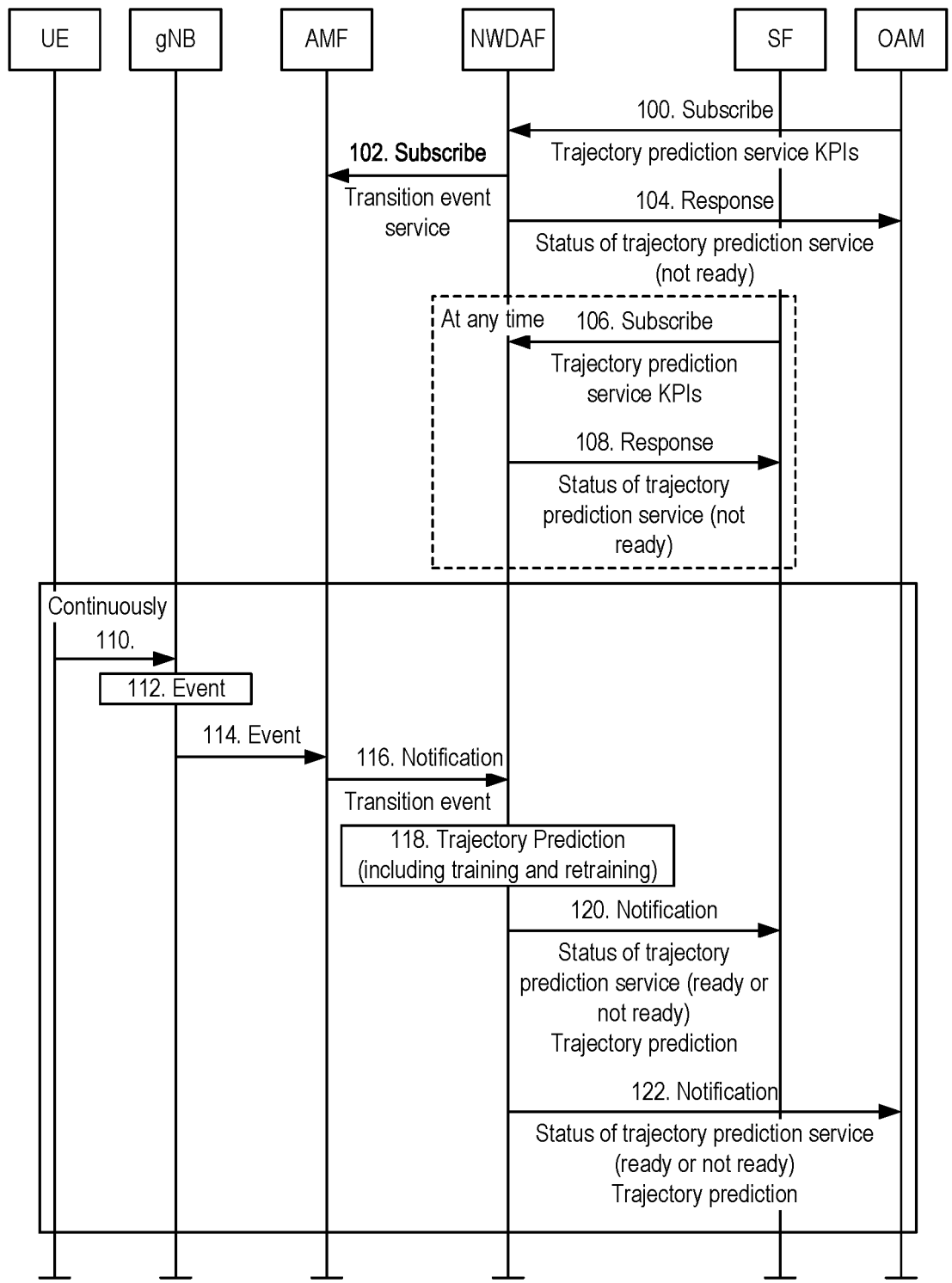
FIG. 1 illustrates the operation of a conventional Network Data Analytics Function (NWDAF) User Equipment (UE) trajectory prediction service.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node. A base station is also referred to herein as a Radio Base Station (RBS).

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing an Access Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

As discussed above, for the UE trajectory prediction model of a Network Data Analytics Function (NWDAF) model to perform well, it is important that enough events on RBS transitions are received. This contradicts the current design of Fourth Generation (4G)/5G networks where mobility handling signaling is kept to a minimum. Under the current design, when the UE is in idle mode and moves within its tracking area list, there are no RBS handover events. The only event an idle UE initiates is the periodic Tracking Area Update (TAU)/Registration Area Update (RAU), which is done one per hour in a default configuration. This means that the NWDAF will not receive all RBS transitions for idle UEs. This, in its turn, will lead to a bad performance of the NWDAF trajectory model to predict the next RBS for a UE.

There may be multiple reasons why performance of the NWDAF trajectory model is not good enough. A first scenario is that performance has never been good, e.g., because there simply has not been enough training data to achieve a good performance. A second scenario is that performance was good but deteriorated over time. Deteriorated performance can have several reasons, including: infrastructure changes, e.g. a new road has opened/a road has closed since the initial training of the model; network changes, e.g. RBSs have been added or removed since initial training of the model; and vacation periods that make people move in a different way than before. It is worth noting that performance issues can be specific for a certain area, for certain times, or even for UEs of a certain capability.

Certain aspects of the present disclosure and their embodiments may provide solutions to the aforementioned or other challenges. According to one aspect, the present disclosure provides methods and systems that involve UEs in the training of the mobility prediction model. In some embodiments, this comprises downloading a trained model to the UE, letting the UE compare predictions from the model with its real movements, and letting the UE act when the predictions are incorrect. Possible actions include, but are not limited to: (1) the UE provides the correct movements to the network, so the network can retrain; 2) the UE retrains the model locally with the correct input and uploads the resulting model to the network.

According to another aspect, the present disclosure provides methods and systems by which the system itself detects that the performance of the NWDAF's trajectory prediction service is not good enough (e.g., an associated Key Performance Indicator (KPI) fails to satisfy a predefined or preconfigured threshold), and the network takes measures to increase the number of base station transition events sent to the NWDAF. By this, the performance of the prediction service will increase.

Certain embodiments may provide one or more of the following technical advantage(s). One advantage of this solution is a mobility prediction service with better performance. Another advantage is that this service can be used by multiple use cases, including paging and UPF re-selection.

Figure 2:
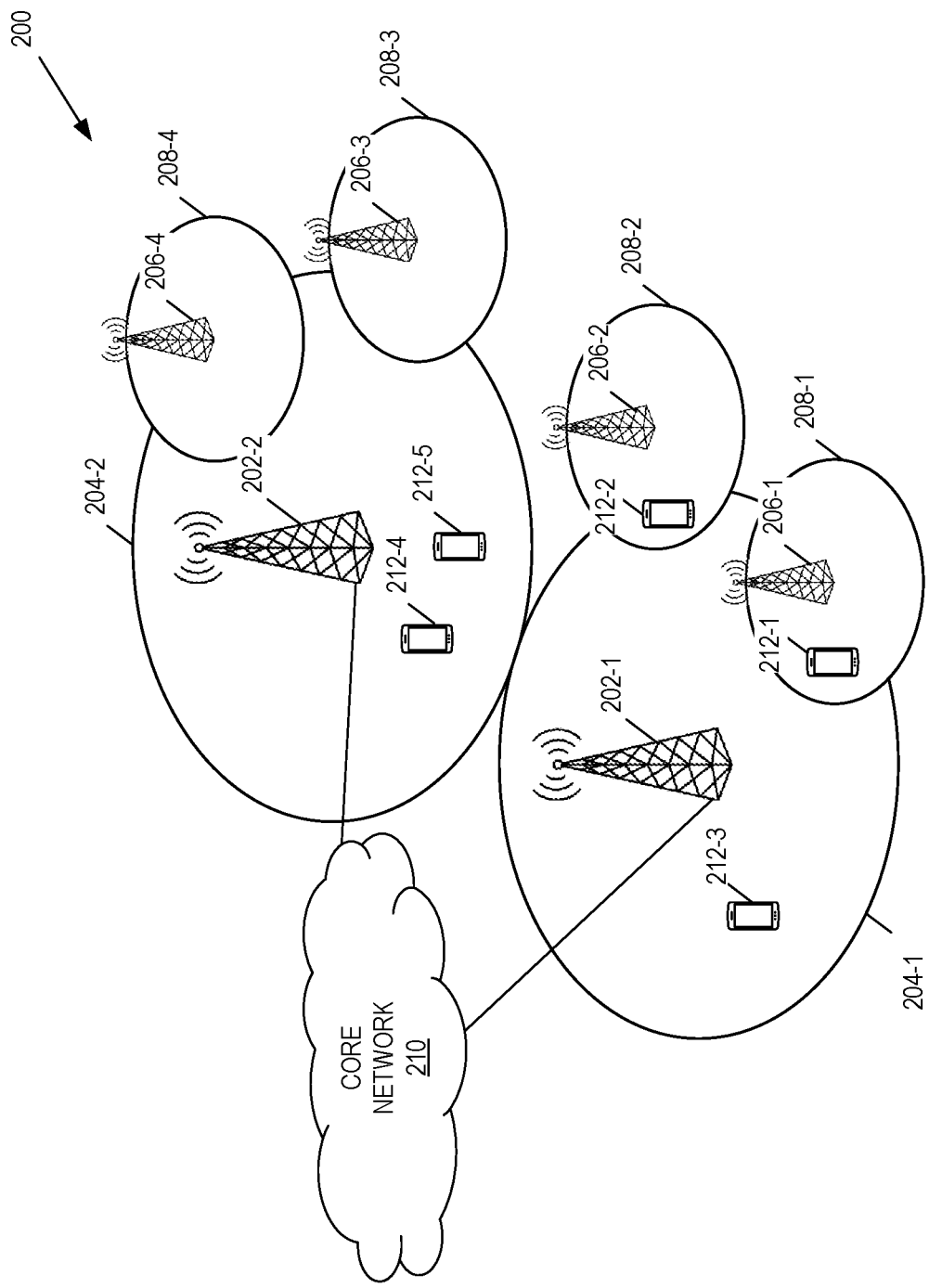
FIG. 2 illustrates one example of a cellular communications system in which embodiments of the present disclosure may be implemented.

FIG. 2 illustrates one example of a cellular communications system 200 in which embodiments of the present disclosure may be implemented. In the embodiments described herein, the cellular communications system 200 may be a 5G System (5GS) including a NR RAN or an Evolved Packet System (EPS) including a LTE RAN. In this example, the RAN includes base stations 202-1 and 202-2, which in LTE are referred to as eNBs and in 5G NR are referred to as gNBs, controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5G Core (5GC) and in the EPS is referred to as the Evolved Packet Core (EPC). The base stations 202 (and optionally the low power nodes 206) are connected to the core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

Figure 3:
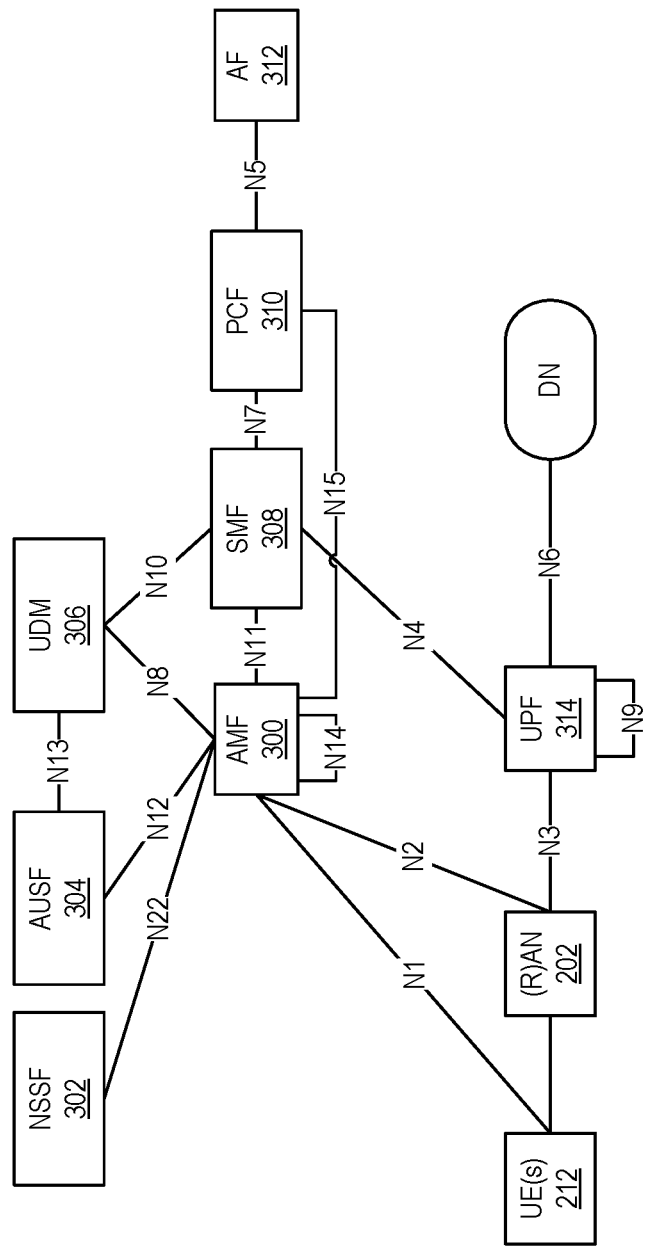
FIGS. 3 and 4 illustrate example embodiments in which the cellular communications system is a Fifth Generation (5G) System (5GS)

FIG. 3 illustrates a wireless communication system represented as a 5G network architecture composed of core NFs, where interaction between any two NFs is represented by a point-to-point reference point/interface. FIG. 3 can be viewed as one particular implementation of the cellular communications system 200 of FIG. 2.

Seen from the access side the 5G network architecture shown in FIG. 3 comprises a plurality of UEs 212 connected to either a RAN 202 or an Access Network (AN) as well as an AMF 300. Typically, the R(AN) 202 comprises base stations, e.g. such as eNBs or gNBs or similar. Seen from the core network side, the 5GC NFs shown in FIG. 3 include a NSSF 302, an AUSF 304, a UDM 306, the AMF 300, a SMF 308, a PCF 310, and an Application Function (AF) 312.

Reference point representations of the 5G network architecture are used to develop detailed call flows in the normative standardization. The N1 reference point is defined to carry signaling between the UE 212 and AMF 300. The reference points for connecting between the AN 202 and AMF 300 and between the AN 202 and UPF 314 are defined as N2 and N3, respectively. There is a reference point, N11, between the AMF 300 and SMF 308, which implies that the SMF 308 is at least partly controlled by the AMF 300. N4 is used by the SMF 308 and UPF 314 so that the UPF 314 can be set using the control signal generated by the SMF 308, and the UPF 314 can report its state to the SMF 308. N9 is the reference point for the connection between different UPFs 314, and N14 is the reference point connecting between different AMFs 300, respectively. N15 and N7 are defined since the PCF 310 applies policy to the AMF 300 and SMF 308, respectively. N12 is required for the AMF 300 to perform authentication of the UE 212. N8 and N10 are defined because the subscription data of the UE 212 is required for the AMF 300 and SMF 308.

The 5GC network aims at separating User Plane (UP) and Control Plane (CP). The UP carries user traffic while the CP carries signaling in the network. In FIG. 3, the UPF 314 is in the UP and all other NFs, i.e., the AMF 300, SMF 308, PCF 310, AF 312, NSSF 302, AUSF 304, and UDM 306, are in the CP. Separating the UP and CP guarantees each plane resource to be scaled independently. It also allows UPFs to be deployed separately from CP functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF 300 and SMF 308 are independent functions in the CP. Separated AMF 300 and SMF 308 allow independent evolution and scaling. Other CP functions like the PCF 310 and AUSF 304 can be separated as shown in FIG. 3. Modularized function design enables the 5GC network to support various services flexibly.

Each NF interacts with another NF directly. It is possible to use intermediate functions to route messages from one NF to another NF. In the CP, a set of interactions between two NFs is defined as service so that its reuse is possible. This service enables support for modularity. The UP supports interactions such as forwarding operations between different UPFs.

Figure 4:
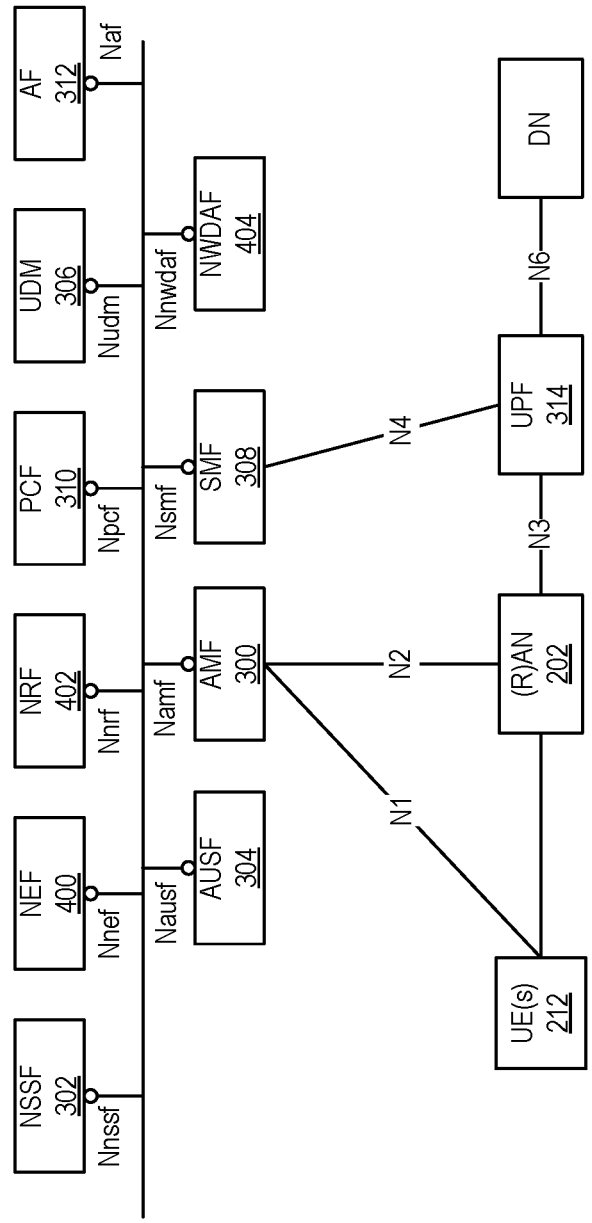

FIG. 4 illustrates a 5G network architecture using service-based interfaces between the NFs in the CP, instead of the point-to-point reference points/interfaces used in the 5G network architecture of FIG. 3. However, the NFs described above with reference to FIG. 3 correspond to the NFs shown in FIG. 4. The service(s) etc. that a NF provides to other authorized NFs can be exposed to the authorized NFs through the service-based interface. In FIG. 4 the service based interfaces are indicated by the letter "N" followed by the name of the NF, e.g. Namf for the service based interface of the AMF 300 and Nsmf for the service based interface of the SMF 308, etc. The NEF 400, the NRF 402, and the NWDAF 404 in FIG. 4 are not shown in FIG. 3 discussed above. However, it should be clarified that all NFs depicted in FIG. 3 can interact with the NEF 400 and the NRF 402 of FIG. 4 as necessary, though not explicitly indicated in FIG. 3.

Some properties of the NFs shown in FIGS. 3 and 4 may be described in the following manner. The AMF 300 provides UE-based authentication, authorization, mobility management, etc. A UE 212 even using multiple access technologies is basically connected to a single AMF 300 because the AMF 300 is independent of the access technologies. The SMF 308 is responsible for session management and allocates Internet Protocol (IP) addresses to UEs. It also selects and controls the UPF 314 for data transfer. If a UE 212 has multiple sessions, different SMFs 308 may be allocated to each session to manage them individually and possibly provide different functionalities per session. The AF 312 provides information on the packet flow to the PCF 310 responsible for policy control in order to support Quality of Service (QoS). Based on the information, the PCF 310 determines policies about mobility and session management to make the AMF 300 and SMF 308 operate properly. The AUSF 304 supports authentication function for UEs or similar and thus stores data for authentication of UEs or similar while the UDM 306 stores subscription data of the UE 212. The Data Network (DN), not part of the 5GC network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

The following description and associated figures describe non-limiting examples of UE-assisted data collection for mobility prediction.

Figure 5A:
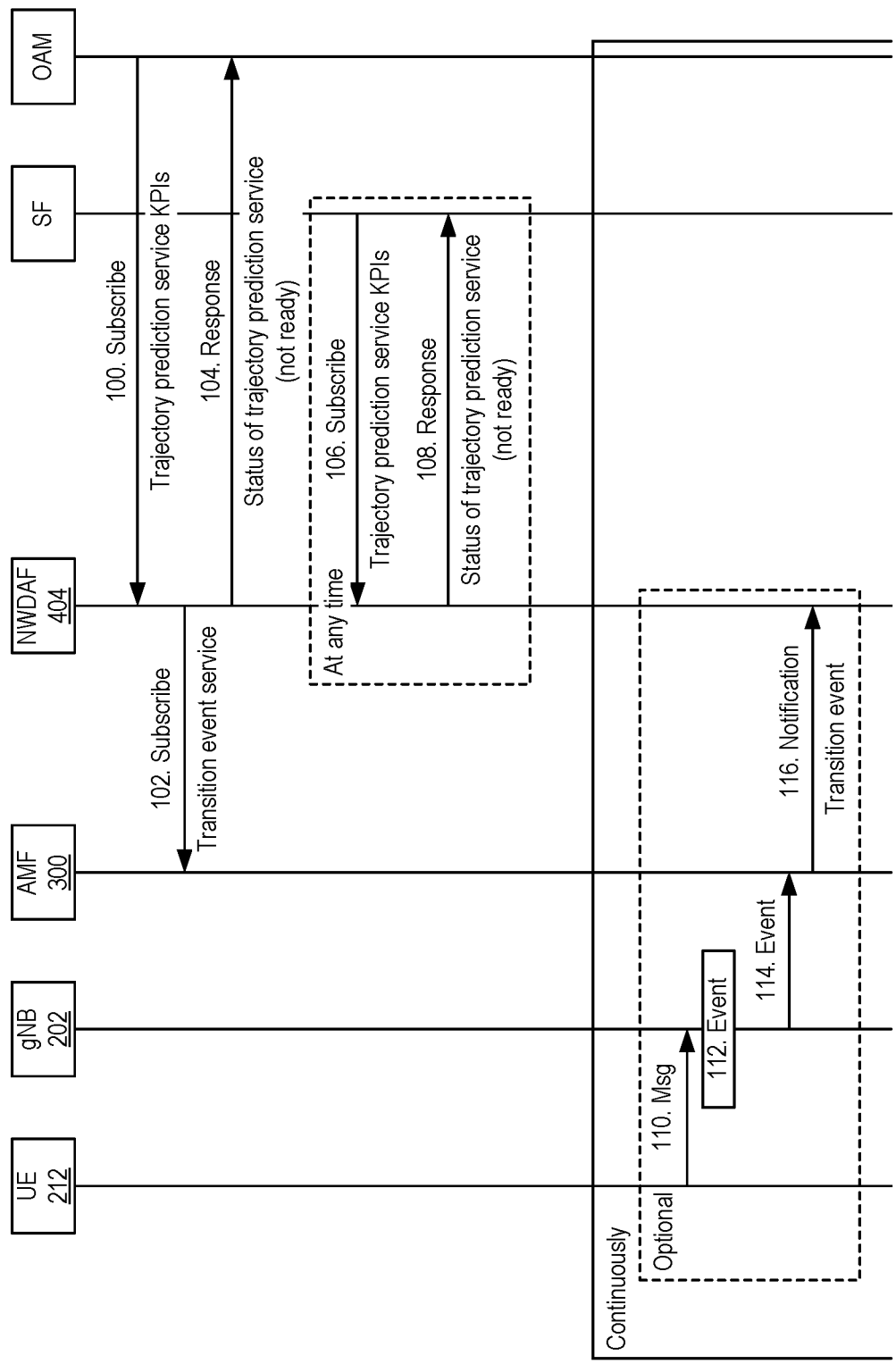
FIGS. 5A and 5B illustrate a process for UE-assisted data collection for mobility prediction according to some embodiments of the present disclosure.
Figure 5B:
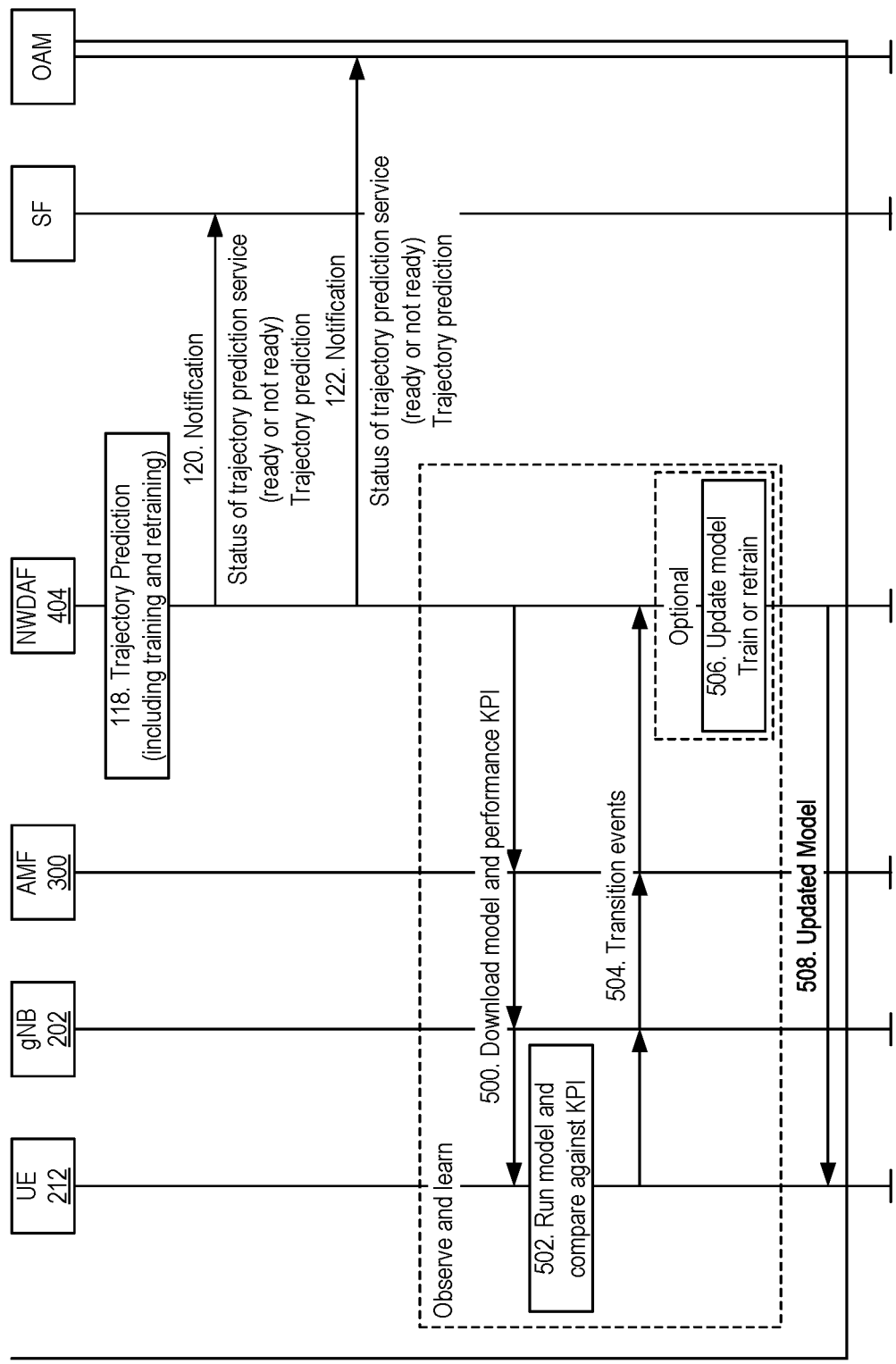

In a first aspect of the present disclosure, UE-assisted data collection is provided. FIGS. 5A and 5B illustrate a process for UE-assisted data collection for mobility prediction according to some embodiments of the present disclosure. In the embodiment illustrated in FIGS. 5A and 5B, UEs 212 continually provide information to the NWDAF 404 which the NWDAF 404 can use to train or retrain the trajectory prediction model. The steps labeled 100 through 122 are the same as the like-numbered steps in FIG. 1, and thus their descriptions will not be repeated here.

In the embodiment illustrated in FIGS. 5A and 5B, however, the NWDAF 404 takes the further actions of downloading a trajectory prediction model and performance KPI(s) to a UE 212 (step 500). The trajectory prediction model downloaded to the UE 212 is that of the UE 212. The model downloaded to the UE 212 may already be trained. The UE 212 installs and runs the model and, when the UE 212 moves, it compares the model's predicted movement with the real movement made (step 502). In this manner, the UE 212 can deduce if the prediction was correct or not.

In the embodiment illustrated in FIGS. 5A and 5B, when the prediction was not correct (or, in general, when the KPI is not met), information on the real movement can be sent to the network, e.g., as transition events (step 504). Note that, as used herein, a "transition event" is an event related to a transition of a respective UE 212 from one RBS to another RBS. Each transition event includes at least a time stamp, a unique UE identifier, and an identifier of the new RBS. The event may include additional information like previous RBS and the time elapsed at the previous RBS, even though such information may also be deduced by the NWDAF 404 from previously received events. The events that the NWDAF 404 receives (step 504) may be used as input to train/retrain the model (step 506). In some embodiments, the UE 212 may only send error notifications, e.g. notifications where there is a discrepancy between the predicted transition versus the actual transition. Alternatively, the UE 212 may also send notifications of other events or other kinds of information that the NWDAF 404 may find useful to train/retrain the model or even information that the NWDAF 404 may find useful for other purposes. In one embodiment, the trained/retrained UE trajectory prediction model resulting from step 506 is updated in the UE 212 (step 508). In one embodiment, updating the UE trajectory prediction model in the UE 212 comprises downloading, to the UE 212, the trained or retrained UE trajectory prediction model. In another embodiment, updating the UE trajectory prediction model in the UE 212 comprises downloading, to the UE 212, updated parameters used by the UE trajectory prediction model in the UE 212.

In some embodiments, the NWDAF 404 may still continue to receive transition events from the AMF 300, e.g. as in step 116. Alternatively, the NWDAF 404 may receive information only from UEs 212 directly, e.g. as in step 504, and not from the AMF 300. In these scenarios, optional step 116 may not occur.

A variant to the solution above is a solution in which the retraining is done in the UEs 212 instead of in the NWDAF 404. That makes it a federated learning solution. This variant is described in FIGS. 6A and 6B.

Figure 6A:
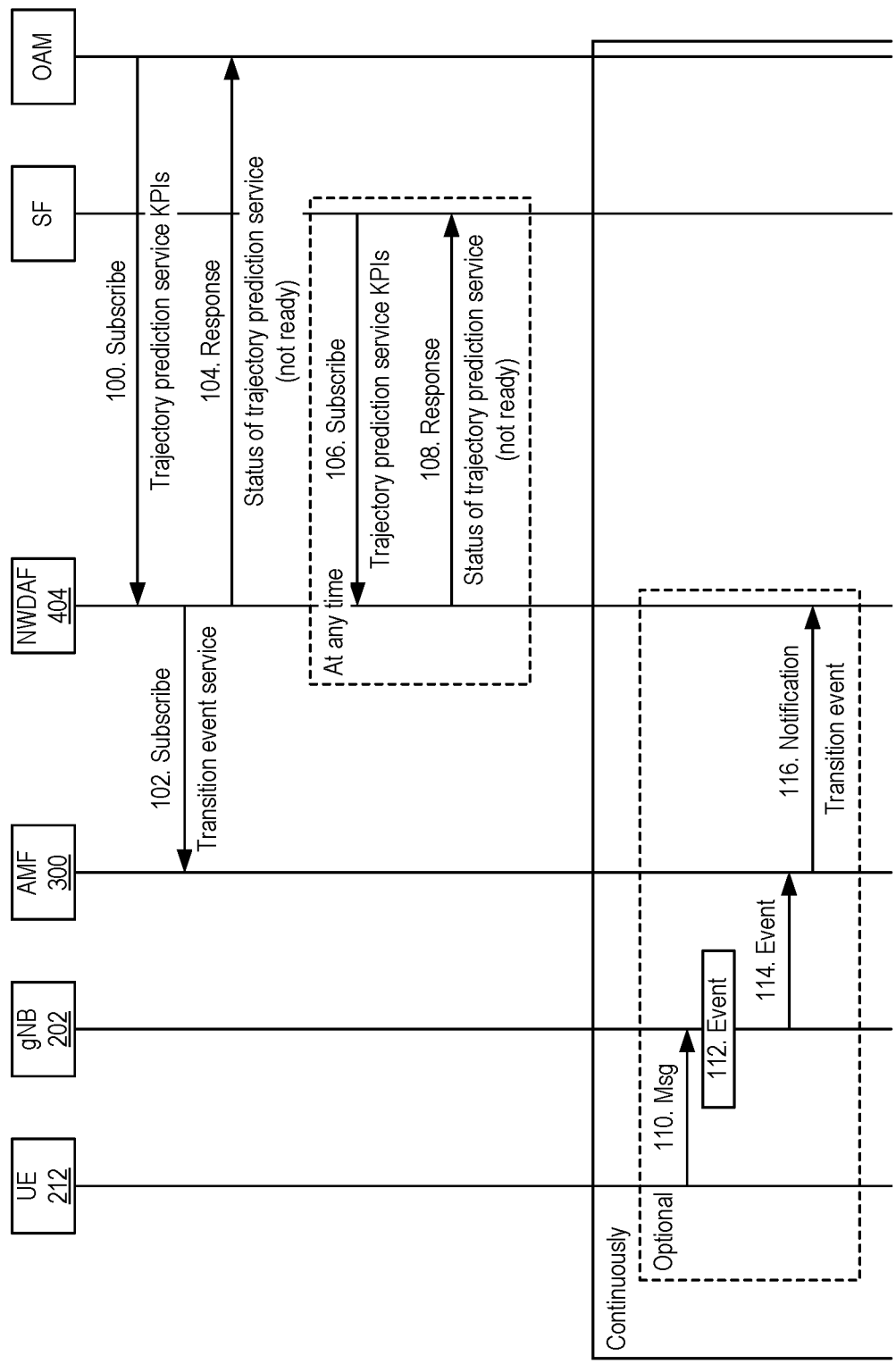
FIGS. 6A and 6B illustrate a process for UE-assisted data collection for mobility prediction according to some other embodiments of the present disclosure.
Figure 6B:
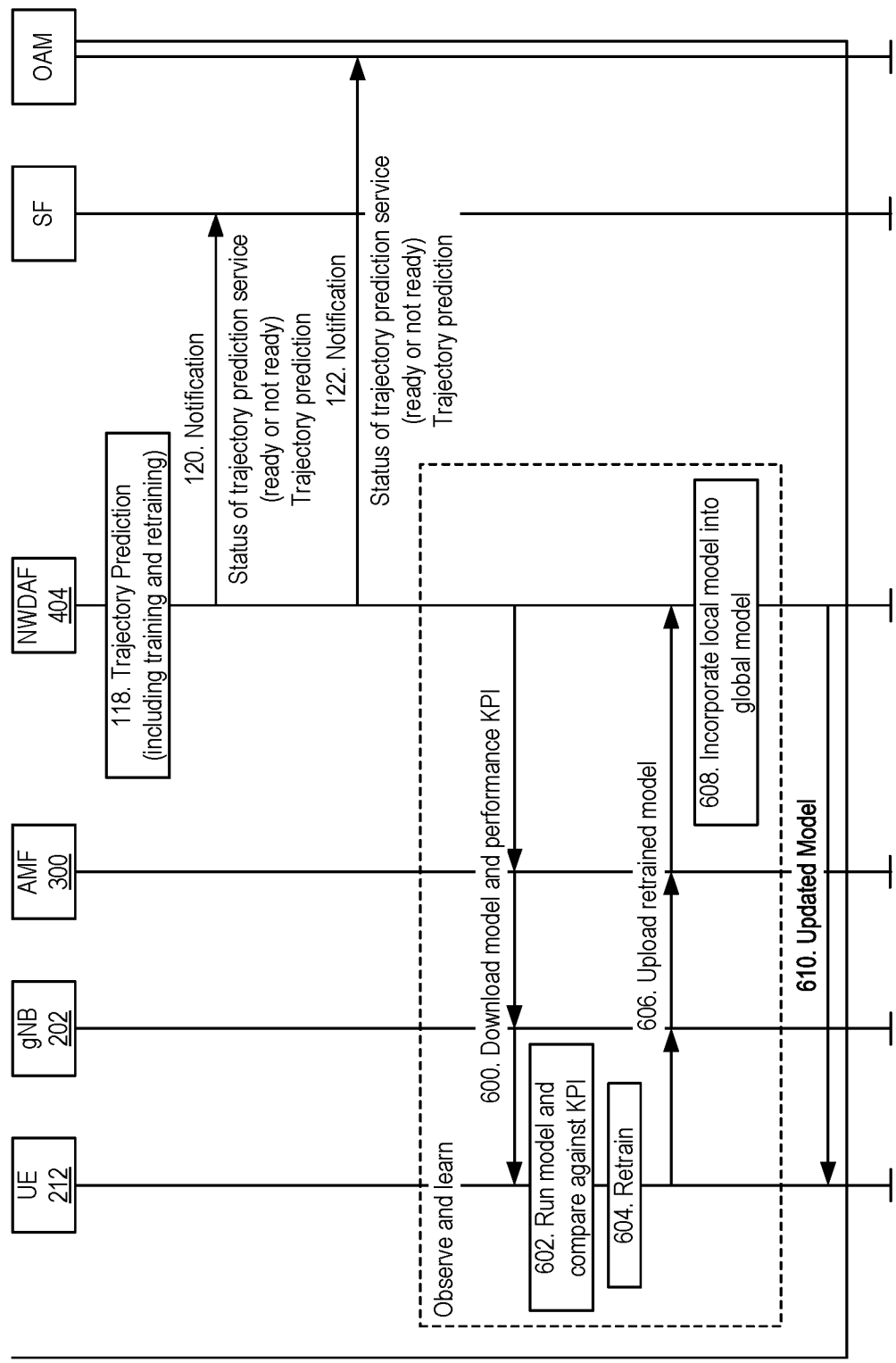

FIGS. 6A and 6B illustrate a process for UE-assisted data collection for mobility prediction according to some embodiments of the present disclosure. In the embodiment illustrated in FIGS. 6A and 6B, UEs 212 continually train or retrain their copy of a trajectory prediction model, which may be eventually uploaded to the NWDAF 404. The steps labeled 100 through 122 are the same as the like-numbered steps in FIG. 1, and thus their descriptions will not be repeated here.

In the embodiment illustrated in FIGS. 6A and 6B, the NWDAF 404 takes the further actions of downloading a trajectory prediction model and performance KPI(s) to the UE 212 (step 600). The model downloaded to the UE 212 may already be trained. The UE 212 installs and runs the model and, when the UE 212 moves, it compares the model's predicted movement with the real movement made (step 602). In this manner, the UE 212 can deduce if the prediction was correct or not.

In the embodiment illustrated in FIGS. 6A and 6B, when the prediction was not correct (or, in general, when the KPI is not met), the local copy of the trajectory prediction model within the UE 212 is trained or retrained (step 604). Either immediately or eventually, the retrained trajectory prediction model is uploaded to the NWDAF 404 (step 606), and the retrained model is incorporated into the master or global model (step 608). In some embodiments, the UE 212 may only send the updated trajectory prediction model. Alternatively, the UE 212 may also send notifications of error events, other events, or other kinds of information that the NWDAF 404 may find useful to train/retrain the model or even information that the NWDAF 404 may find useful for other purposes. In these embodiments, the model maintained by the NWDAF 404 may be retrained independently of the model maintained by the UE 212 (e.g., also using data from other UEs), and when the UE 212 uploads its updated trajectory prediction model, the NWDAF 404 may reconcile the model from the UE 212 with the NWDAF's 404 internally-maintained model.

In one embodiment, the trained/retrained UE trajectory prediction model resulting from step 608 is updated in the UE 212 (step 610). In one embodiment, updating the UE trajectory prediction model in the UE 212 comprises downloading, to the UE 212, the trained or retrained UE trajectory prediction model. In another embodiment, updating the UE trajectory prediction model in the UE 212 comprises downloading, to the UE 212, updated parameters used by the UE trajectory prediction model in the UE 212.

In some embodiments, the NWDAF 404 may still continue to receive transitions events from the AMF 300, e.g. as in step 116. Alternatively, the NWDAF 404 may receive information only from UEs 212 directly, e.g. as in step 606, and not from the AMF 300. In these scenarios, optional step 116 may not occur.

In this variant, each UE 212 retrains its local model with input from its own observations (step 604). A retrained local model, or a set of parameters such as weights in a neural network, is uploaded to the network (step 606), where the NWDAF 404 incorporates the local model into the global model (step 608).

In some embodiments, multiple local models may be combined this way, optionally retrained with additional input from the AMF 300 (step 116), and the resulting model can be used to serve the different service functions (steps 118, 120, and 122) and downloaded again to the UEs (step 600).

In regard to UE behavior, the UE 212 keeps track of the last n transitions since these are used as input to the model, where n is configurable via the RAN broadcast channel, Non-Access Stratum (NAS) signaling, or UE device management. The recorded transitions are used as described above.

To choose between the first or the second solution above, the UE 212 is provided with a rule. The rule is provisioned to the UE 212 by different means including NAS signaling, which is extended for the purpose. Alternative signaling paths could be via Radio Resource Control (RRC) or via an application layer.

When the network instructs the UE 212 to observe mobility events, the UE 212 starts to track its movements. Besides replying to report requests by the RAN, the UE 212 also makes observations between these reports. Regardless of whether the UE 212 is in the CONNECTED state or the IDLE state, the UE 212 observes for example which base station provides the strongest signal. This way, the UE 212 builds a list of transitions that can be used for training.

In regard to what UEs to select for use in obtaining UE-assisted data for mobility prediction, the following general criteria may be considered. Downloading/uploading, running, and retraining in the UE 212 introduce a new cost in terms of energy consumption, computing resources, and signaling. Increased battery consumption in the UE 212 is an issue. Therefore, it is important that the right set of UEs 212 is chosen. Not all UEs 212 need to run a local model, and UEs 212 that run a local model may not always do this. Example criteria to select the UEs 212 that need to be involved include:

Pick UEs 212 in a certain area/region where we see worse performance.

Divide UEs 212 into categories (such as rarely moving, quickly moving, etc.) and pick UEs 212 in the category where the performance is not up to par.

Pick UEs 212 that have no or large batteries; e.g. vehicle mounted UEs.

Observe that a certain class of UEs 212 (e.g., UEs that have a certain set of Radio Access Technology (RAT) and frequency bands supported) perform worse; the selected UEs 212 would come from this class.

Also, observing that performance is worse at certain periods of a day/week/year, the NWDAF 404 can assist the OAM to select the right time when to have more data reported from the selected set of UEs 212.

In a second aspect, gap analysis is provided. A more advanced way for UE selection is to let the NWDAF 404 or OAM perform an analysis to determine where there are gaps in the data. The underlying assumption is that gaps cause bad prediction performance. This is illustrated in the process of FIGS. 7A and 7B.

Figure 7A:
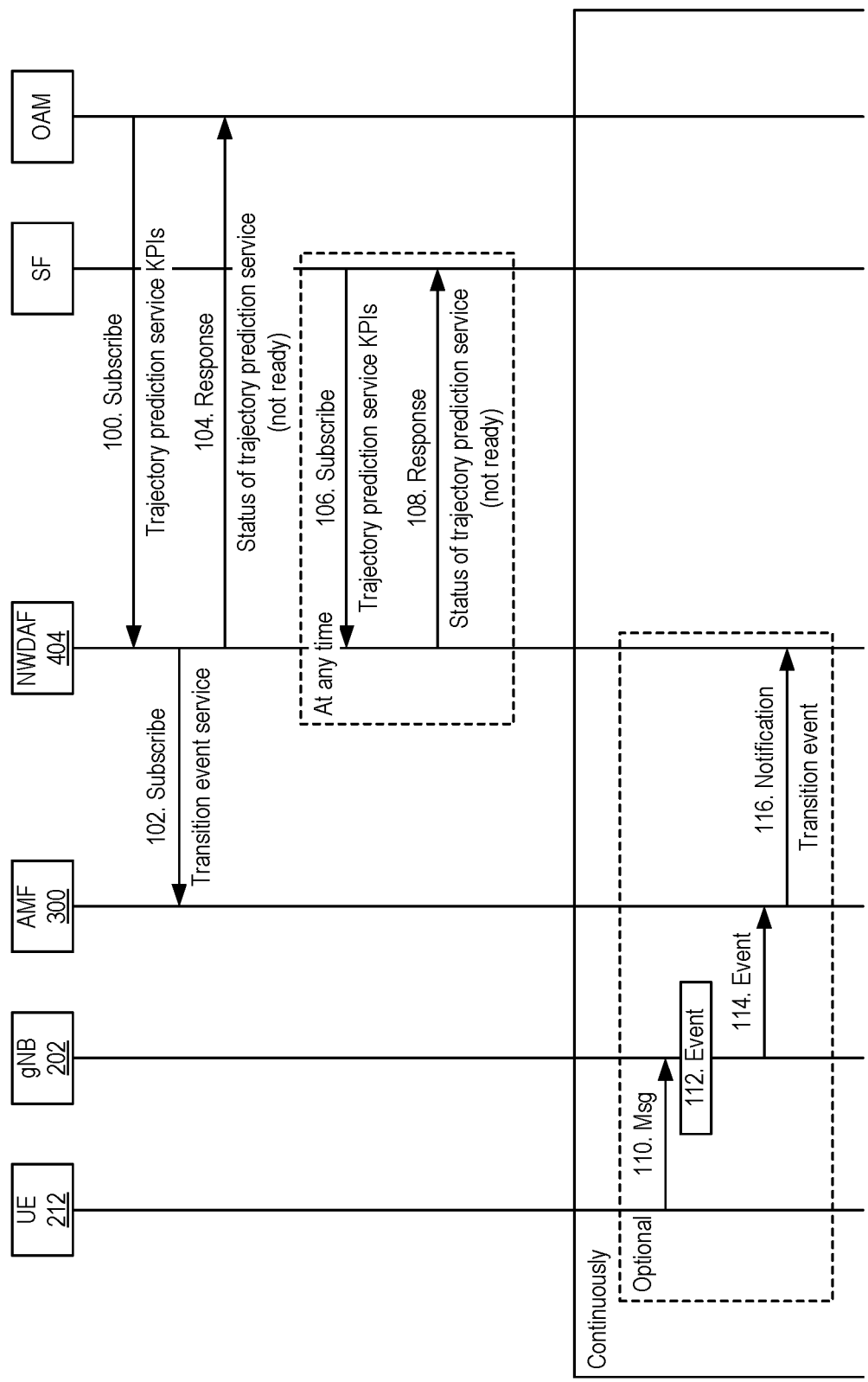
FIGS. 7A and 7B illustrate a process by which a system can detect that the performance of the UE trajectory prediction service is not good enough and takes measures to increase the number of base station transition events available to train or retrain the UE trajectory prediction model, according to some embodiments of the present disclosure.
Figure 7B:
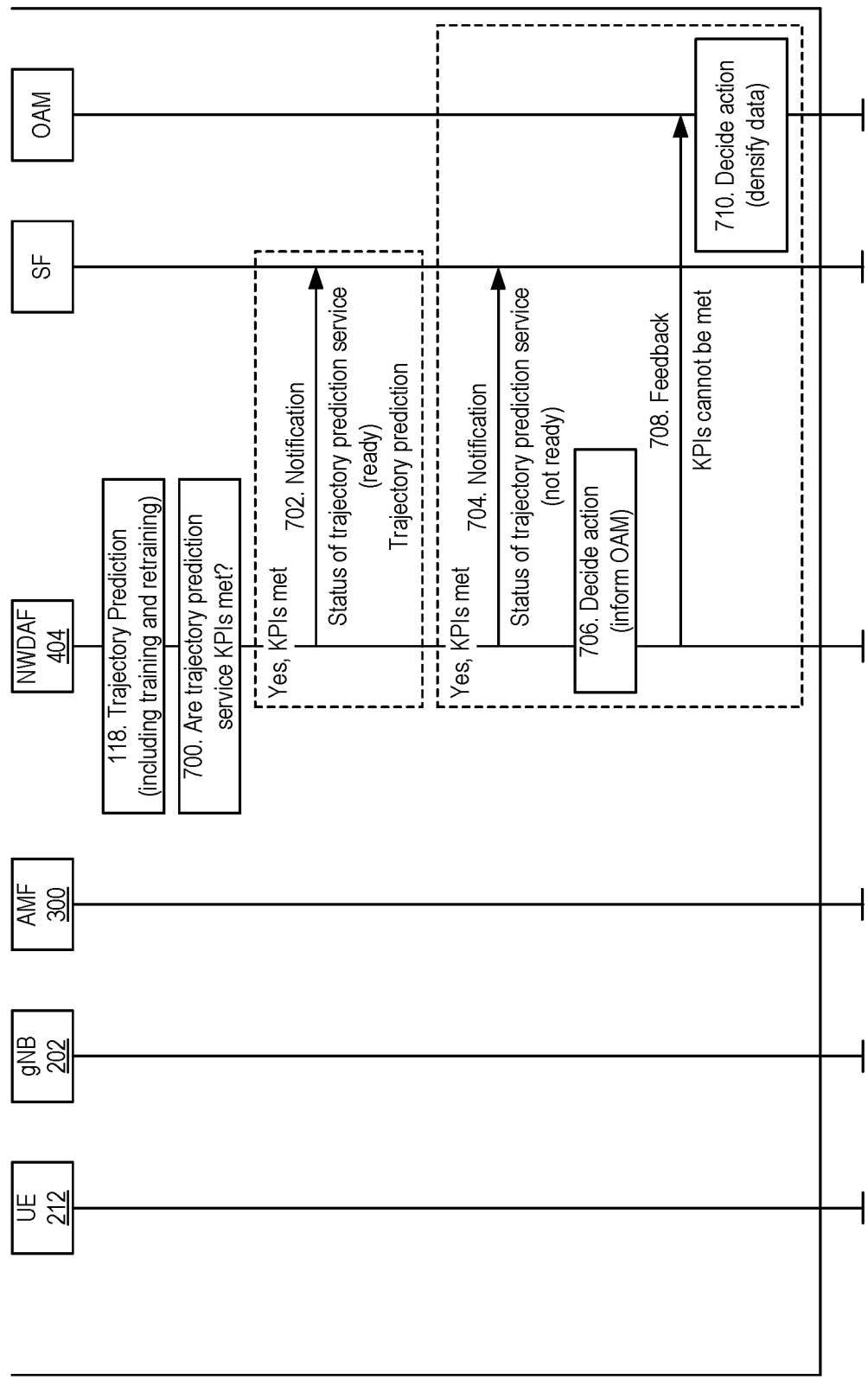

FIGS. 7A and 7B illustrate a process by which a system can detect that the performance of the NWDAF's trajectory prediction service is not good enough, and takes measures to increase the number of base station transition events sent to the NWDAF 404, according to some embodiments of the present disclosure. The steps labeled 100 through 122 are the same as the like-numbered steps in FIG. 1, and thus their descriptions will not be repeated here.

In the embodiment illustrated in FIGS. 7A and 7B, however, each prediction on the next RBS that the UE will end up at will have a certain accuracy. Prediction accuracy can be measured by comparing the predictions with the information in the transition events coming from the AMF 300. A typical KPI is the percentage of transitions that was predicted correctly. This KPI will vary over time. When the model is still untrained performance will be low. But for various reasons the KPIs of an already trained model may also vary over time. For example, when too little retraining data is provided. In our use case, too little data is provided when too many UEs generate too few events over too long of a time period.

We define the prediction service to be "ready" when its performance is above the given KPI (or KPIs). This KPI is provided by the OAM (step 100), or by the subscriber of the service (step 106), or by both. In the latter case, the OAM may provide a minimal KPI. The subscriber is notified when the service becomes "ready" or "not ready" (steps 104 and 108).

In the embodiment illustrated in FIGS. 7A and 7B, the system determines whether or not the model's performance is below a given KPI, e.g. that trajectory prediction service KPIs are not met (step 700). If the model's performance is acceptable, e.g. the KPIs are met, the NWDAF 404 notifies the subscriber(s) that the trajectory prediction service is ready and provides a trajectory prediction (step 702). If the model's performance is not acceptable, the NWDAF 404 notifies the subscriber(s) that the trajectory prediction service is not ready (704), and decides to take some action to improve the model performance (step 706). In the embodiment illustrated in FIGS. 7A and 7B, for example, the NWDAF 404 determines that it should notify the OAM that KPIs cannot be met (step 708), and the OAM can decide to take action to densify the data (step 710).

In the flow chart above, the NWDAF 404 is the entity that measures the model's performance. It is the NWDAF 404 that notifies the OAM, and the OAM is the one that initiates the action. Many variants on the division of these tasks can be made:

The NWDAF 404 may contact the AMF 300 directly when performance drops below a given threshold and request the AMF 300 to produce more events.

The SF could do its own performance measurements and report to the NWDAF 404 or the OAM.

The NWDAF 404 may decide upon the action to take (instead of the OAM) and request the OAM to perform the action. The OAM may in this case forward the request to the AMF 300.

Actions that the OAM can take include, but are not limited to, instructing the NWDAF 404 to download local UE trajectory prediction models to UEs 212 as described in regard to the first aspect of the present disclosure. Other actions include:

Preventing UEs from going to idle. One way for the OAM to request the AMF 300 to produce more events is to prevent a small number of UEs 212 from going idle. Thus, in one embodiment, the OAM sends a command to the AMF 300 instructing the AMF 300 to keep the UE 212 connected. When the UE 212 does not go into idle mode, it will produce events when doing RBS handovers. The AMF 300 then forwards these events to the NWDAF 404 as RBS transitions.

If the OAM sends such a request and the UE 212 is already idle, then the AMF 300 can page the UE 212 according to the existing paging procedure (see 3GPP Technical Specification (TS) 23.502 section 4.2.3.3). Normally, the UE 212 will go to idle after a certain time of inactivity. It is the RBS (e.g., gNB or eNB) that keeps such timer and initiates the procedure of going to idle (see 3GPP TS 23.502 section 4.2.6). In one embodiment, the AMF 300 may set this timer to a value provided by the OAM; that is, the period the UE 212 needs to provide handover events even if no traffic is going to or from the UE 212. This parameter may in its turn be provided to the RBS from the AMF 300. Note that the procedure may be on a per-UE basis, so the "period" parameter may be different for different UEs.

In an alternative embodiment, the OAM may communicate to the UE 212 via ordinary UP signaling. The UE 212 may have a special application, or the OAM may send pings. In this case, paging will be initiated due to the first downlink UP packet from the OAM (all according the existing procedure in 3GPP TS 23.502 section 4.2.3.3). To prevent the UE 212 from going to idle, the OAM may periodically re-send a downlink UP packet.

Smaller tracking areas. Another way to get more mobility events from the UEs would be by adjusting tracking area lists. A small set of UEs may receive a tracking area list that spans a smaller area. This way, these UEs are forced to produce more TAU events when they move.

Shorter periodic update timer. When the UE is in idle mode, it periodically does a registration update (3GPP TS 23.501 section 5.3.2) to notify the network that it is still alive. This leads to an AMF event and includes the current RBS of the UE 212. The AMF 300 can forward this information as transition to the NWDAF 404. The periodic registration update timer is part of the UE profile and is provided to the UE at registration. The UE configuration update procedure (3GPP TS 23.502 section 4.2.4.2) can be used to provide a new value.

For the OAM to request more mobility events, it could instruct the AMF 300 to send a periodic registration update timer to the UE 212, where the timer has a small value (for example, a few minutes instead of the default value of one hour).

User location services. Yet another way feed the NWDAF 404 with additional transition events is to use the 3GPP user location services as described in 3GPP TS 23.273 section 6.1.2. In such a scenario, the NWDAF 404 acts as an external client periodically requesting the UE's location. In our use case, the format of the provided location data may be RBS identity.

In the actions described above, existing procedures are used to generate more events. Another way would be to introduce new mechanisms for acquiring UE location information.

New Information Elements (IEs). In one embodiment, new IEs may be added to the system information that every RBS broadcasts (see 3GPP TS 36.300). If there are gaps in the data set in a given area, the OAM instructs the RBSs in that area to indicate in the system information that UEs 212 need to provide location information. UEs 212 may do this using existing procedures (like sending a periodic update), or by a new procedure (like providing location information via NAS to the AMF 300, where the AMF 300 forwards it to the OAM).

External metadata. Another way to provide more training data to the model would be to generate transitions for imaginary UEs from external metadata. One possible scenario would be to acquire the physical positions of the RBSs and place them on a map. The map may also hold information on roads, the type of roads, and the speeds limits of the roads. Given this information, an imaginary UE could perform a trajectory along these roads. Such trajectory could then be the basis for generating RBS transitions that are used to train the model in the NWDAF 404.

Non-moving UEs. A special class of UEs 212 are those for which the NWDAF 404 receives no transitions for a long time. This includes non-moving UEs, or UEs that only move within their tracking area list. Since the NWDAF 404 never receives training data for such UEs, a trajectory prediction is difficult to make. One way to accommodate for this class of UEs would be to let the AMF 300 periodically produce transitions where source and target RBSs are equal.

Figure 8:
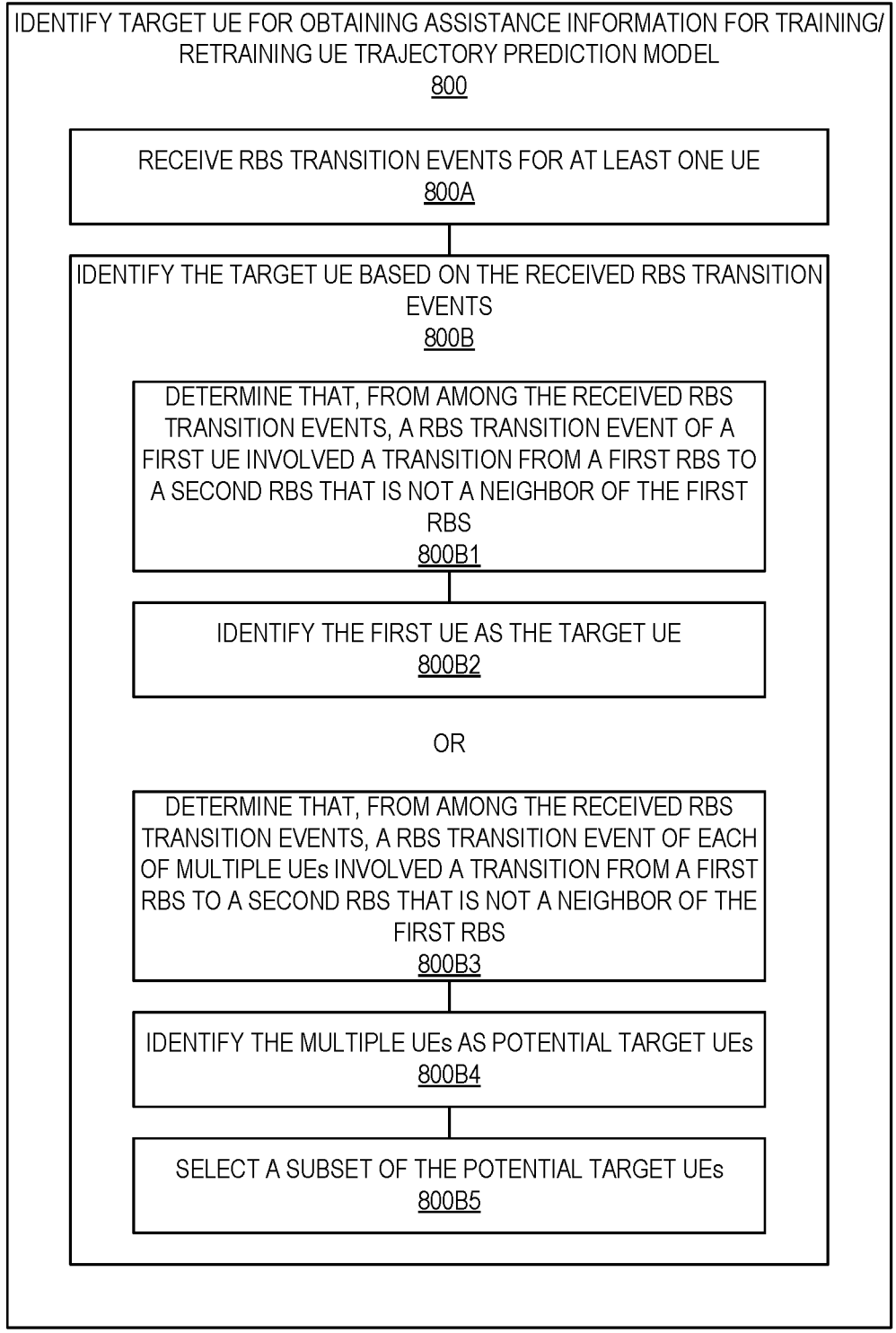
FIG. 8 illustrates a process for identifying a target UE from which to obtain assistance information for training or retraining a respective UE trajectory prediction model, in accordance with some embodiments of the present disclosure.

FIG. 8 illustrates a process for identifying a target UE 212 in accordance with some embodiments of the present disclosure. This process for identifying the target UE 212 may be performed prior to steps 500 in the process of FIGS. 5A and 5B or prior to step 600 in the process of FIGS. 6A and 6B in order to select the UE 212 to which to download the UE trajectory prediction model in order to obtain assistance information for training/retraining that model. As illustrated, the process includes identifying a target UE 212 from which to obtain assistance information for training/retraining the respective UE trajectory prediction model (step 800). In one embodiment, identifying the target UE 212 includes receiving RBS transition events from at least one UE 212 (step 800A) and, based on the received RBS transition events, identifying a target UE 212 from which to obtain assistance information for training/retraining the respective UE trajectory prediction model (step 800B).

In one embodiment, in order to identify the target UE 212 in step 800B, the process includes determining that, from among the received RBS transition events, an RBS transition event of a first UE involved in a transition from a first RBS to a second RBS that is not a neighbor of the first RBS (step 80061), and identifying the first UE as the target UE 212 (step 80062).

In another embodiment, in order to identify the target UE 212 in step 800B, the process includes: determining that, from among the received RBS transition events, an RBS transition event of each of multiple UEs involved in a transition from a first RBS to a second RBS that is not a neighbor of the first RBS (step 80063); identifying the multiple UEs as potential target UEs for downloading the respective UE trajectory prediction model (step 80064); and selecting a subset of potential target UEs as target UE(s) for downloading the respective UE trajectory prediction model, where the subset of potential target UEs includes the identified target UE (step 80065). In one embodiment, selecting the subset of the potential target UEs is done based on one or more parameters (e.g., presence of the UE in a region or area where performance of the UE trajectory prediction model is below a threshold, a UE class or type, a UE speed, a type of UE motion, a UE behavior, a RAT or frequency bands supported by the UE, and/or UE battery capacity).

In an alternative embodiment, identifying the target UE in step 800 includes receiving an identity of the target UE from an OAM node.

Figure 9:
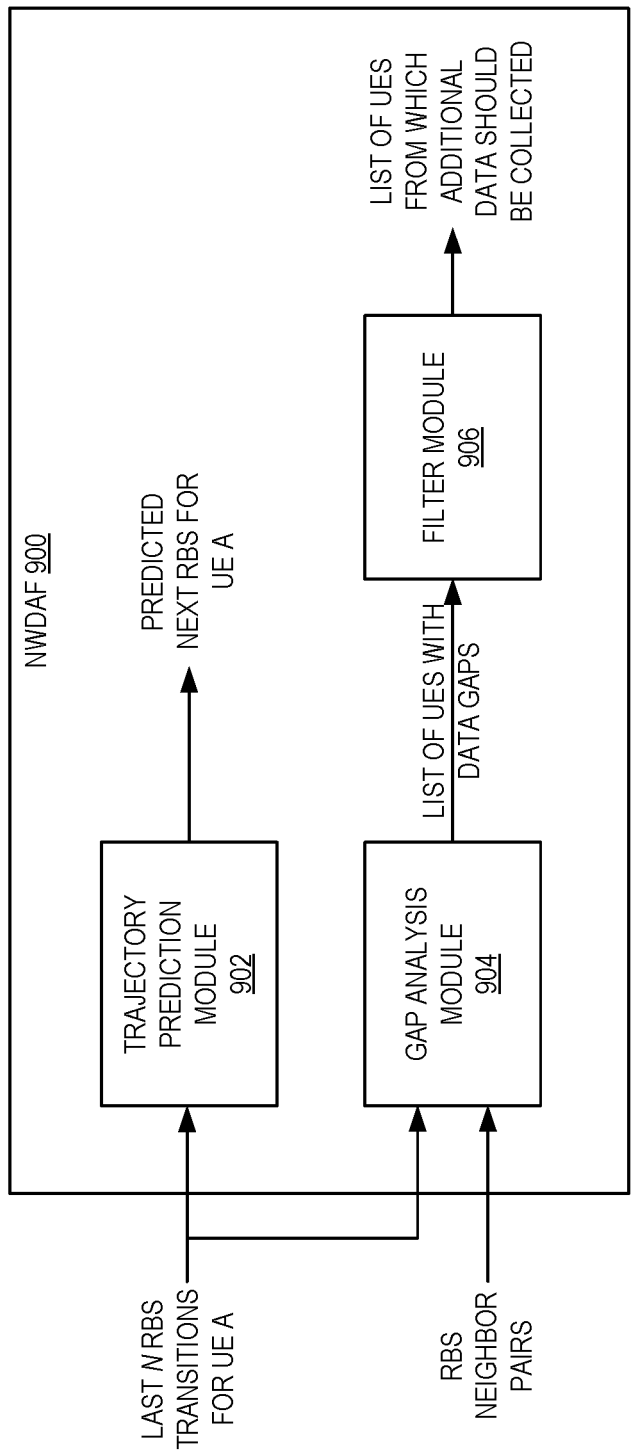
FIG. 9 is a block diagram for an NWDAF for performing a process for UE-assisted data collection for mobility prediction according to some embodiments of the present disclosure.

FIG. 9 is a block diagram for an NWDAF for performing a process for UE-assisted data collection for mobility prediction according to some embodiments of the present disclosure. In the embodiment illustrated in FIG. 9, an NWDAF 900 (which corresponds to the NWDAF 404) includes a trajectory prediction module 902, a gap analysis module 904, and a filter module 906.

The trajectory prediction module 902 receives information about the last N number of RBS transitions for a UE, referred to as "UE A". The trajectory prediction module 902 predicts the next RBS for UE A.

In some embodiments, the trajectory prediction model 902 uses a number of last transactions as input; for example, one embodiment uses the last four transactions. Transaction information includes current and previous RBS and event type that caused the transaction. If the event type is a handover, then the NWDAF 900 knows that the UE was in connected mode, since this is how the handover procedure is designed. This implies that the current and previous RBS seen in that handover event are physical neighbors. By observing all handover events over a longer period, the NWDAF 900 can build an RBS map of all physical neighbors. Of course, a map of physical neighbors can also be acquired in other ways; for example, as external metadata.

When a transition comes with a non-handover event type, for example a periodic registration update, the NWDAF 900 can use the neighbor map to deduce if the current and previous RBSs are physical neighbors. If not, then the NWDAF 900 can conclude that there is a gap in the data for this UE. In other words, the UE is or has been idle, and while being idle the UE has—within its tracking area list—passed one or more RBSs on its trajectory for which no mobility event was created.

In some embodiments, the NWDAF 900 can be designed with the gap analysis module 904. This module produces a list of UEs for which gaps are seen. Another module may analyze that list and filter out UEs for which there are many or large gaps. The UEs from this filtered list can then be involved in the process of training as described above. The gap analysis module 904 may receive the information about the last N RBS transitions for UE A, compare the RBS transitions to see if they involve a transition between known RBS neighbor pairs (about which the gap analysis module 904 also receives information), and produce a list of UEs with data gaps. This information is provided to the filter module 906.

The filter module 906 filters the list of UEs with data gaps to create a list of UEs from which additional data should be collected (a process also referred to as "data densification"). The UEs on this list are candidate targets into which to download and install the UE-based trajectory prediction module and performance KPIs discussed in detail above.

The previous sections describe how the network selects UEs that are to be involved in the data collection and retraining of the model. In some embodiments, the network may also choose a group of UEs (for example, a group of UEs that is currently in a geographical location with bad prediction) and instruct those UEs to form a collaborative group. Information on movements or retrained model updates can be shared directly (even device-to-device) between these UEs. In this manner, group-based learning is provided.

Figure 10:
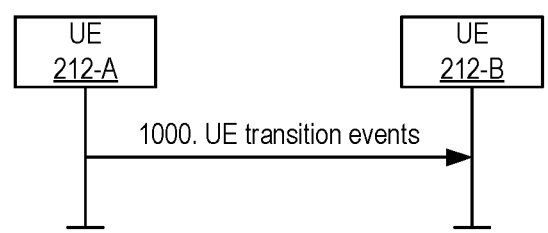
FIGS. 10 and 11 illustrate sharing of assistance information for training or retraining UE trajectory prediction between UEs in accordance with some embodiments of the present disclosure.
Figure 11:
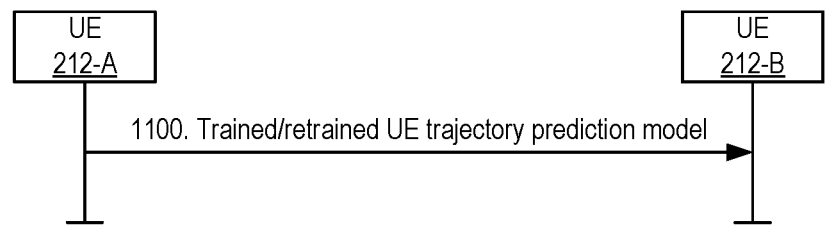

For example, looking at the process of FIGS. 5A and 5B, the UE 212 may send the information of step 504 to another UE(s) in the same collaborative group, as illustrated in step 1000 of FIG. 10. As another example, looking at the process of FIGS. 6A and 6B, the UE 212 may send the information of step 606 to another UE(s) in the same collaborative group, as illustrated in step 1100 of FIG. 11.

In FIGS. 1, 5A, 5B, 6A, and 6B, the NWDAF 404 and the AMF 300 communicate directly. In alternative embodiments, the NWDAF 404 and the AMF 300 may communicate via the OAM. Such approach would give the OAM more control over which UEs to select, when to involve these UEs in the process, and what KPI each UE should measure against.

The examples above are described from the context of a mobility prediction use case. However, the ideas and concepts apply just as well to other use cases, like UE communication patterns, which involve such questions as what traffic is produced and/or consumed by a UE, at what time, and where.

Figure 12:
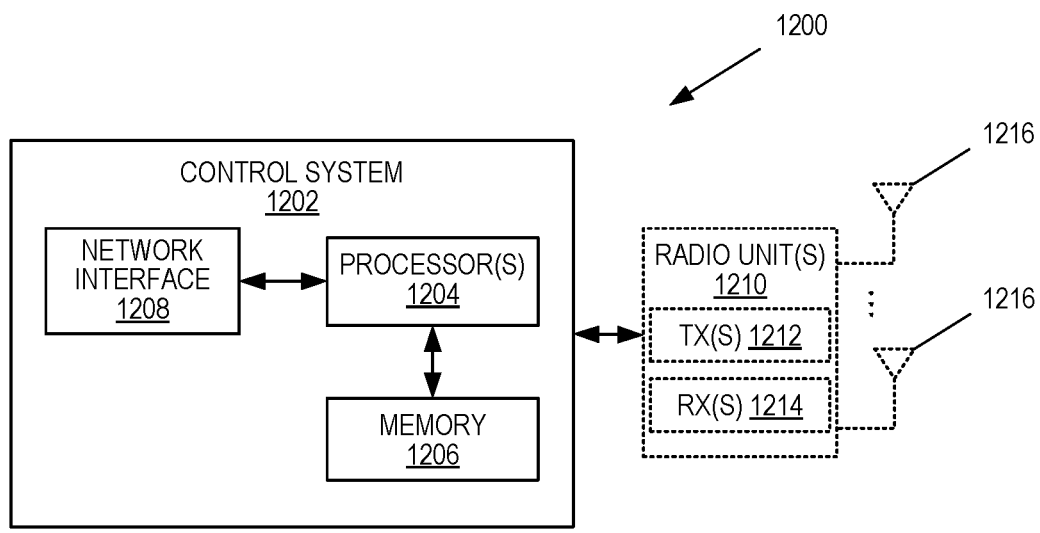
FIGS. 12 through 14 are schematic block diagrams of example embodiments of a network node in accordance with some embodiments of the present disclosure.

FIG. 12 is a schematic block diagram of a network node 1200 according to some embodiments of the present disclosure. The network node 1200 may be a radio access node or a core network node. A radio access node may be, for example, a base station 202 or 206. As illustrated, the network node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. In addition, the network node 1200 may include one or more radio units 1210 that each includes one or more transmitters 1212 and one or more receivers 1214 coupled to one or more antennas 1216. The radio units 1210 may be referred to or be part of radio interface circuitry. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of a network node 1200 as described herein. In some embodiments, the function(s) are implemented in software that is stored, e.g., in the memory 1206 and executed by the one or more processors 1204.

Figure 13:
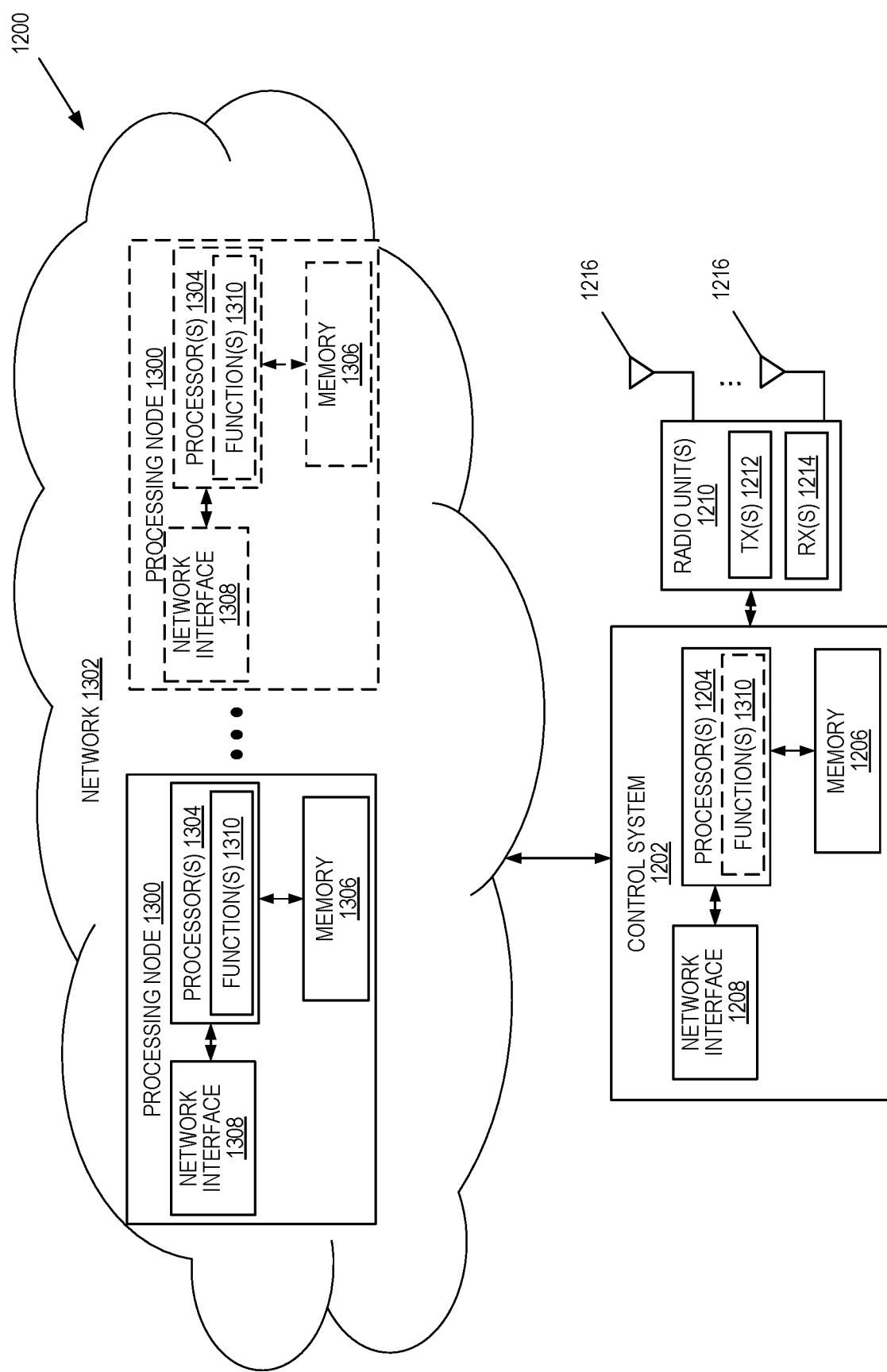

FIG. 13 is a schematic block diagram that illustrates a virtualized embodiment of the network node 1200 according to some embodiments of the present disclosure. This discussion is equally applicable to other types of network nodes. Further, other types of network nodes may have similar virtualized architectures.

As used herein, a "virtualized" radio access node is an implementation of the network node 1200 in which at least a portion of the functionality of the network node 1200 is implemented as a virtual component(s) (e.g., via a virtual machine(s) executing on a physical processing node(s) in a network(s)). As illustrated, in this example, the network node 1200 includes the control system 1202 that includes the one or more processors 1204 (e.g., CPUs, ASICs, FPGAs, and/or the like), the memory 1206, and the network interface 1208 and the one or more radio units 1210 that each includes the one or more transmitters 1212 and the one or more receivers 1214 coupled to the one or more antennas 1216, as described above. The control system 1202 is connected to the radio unit(s) 1210 via, for example, an optical cable or the like. The control system 1202 is connected to one or more processing nodes 1300 coupled to or included as part of a network(s) 1302 via the network interface 1208. Each processing node 1300 includes one or more processors 1304 (e.g., CPUs, ASICs, FPGAs, and/or the like), memory 1306, and a network interface 1308.

In this example, functions 1310 of the network node 1200 described herein are implemented at the one or more processing nodes 1300 or distributed across the control system 1202 and the one or more processing nodes 1300 in any desired manner. In some particular embodiments, some or all of the functions 1310 of the network node 1200 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicate directly with the processing node(s) 1300 via an appropriate network interface(s).

In some embodiments, a computer program including instructions which, when executed by at least one processor, causes the at least one processor to carry out the functionality of network node 1200 or a node (e.g., a processing node 1300) implementing one or more of the functions 1310 of the network node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
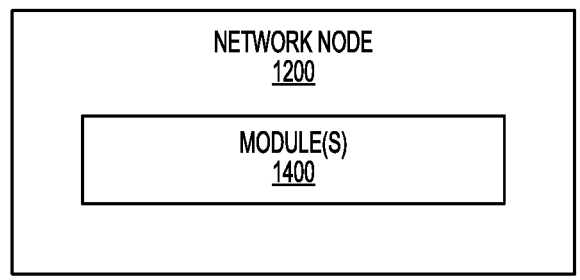

FIG. 14 is a schematic block diagram of the network node 1200 according to some other embodiments of the present disclosure. The network node 1200 includes one or more modules 1400, each of which is implemented in software. The module(s) 1400 provide the functionality of the network node 1200 described herein. This discussion is equally applicable to the processing node 1300 of FIG. 13 where the modules 1400 may be implemented at one of the processing nodes 1300 or distributed across multiple processing nodes 1300 and/or distributed across the processing node(s) 1300 and the control system 1202.

Figure 15:
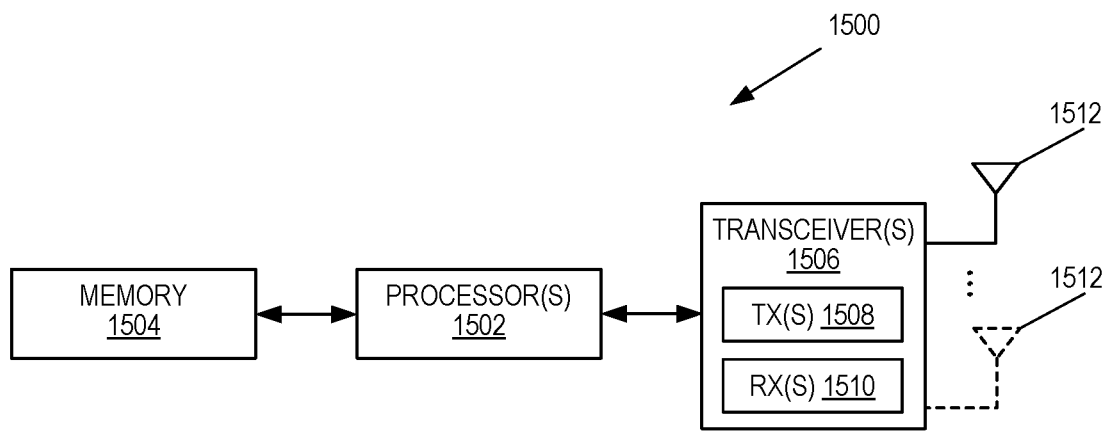
FIGS. 15 and 16 are schematic block diagrams of example embodiments of a UE in accordance with some embodiments of the present disclosure.

FIG. 15 is a schematic block diagram of a UE 1500 according to some embodiments of the present disclosure. As illustrated, the UE 1500 includes one or more processors 1502 (e.g., CPUs, ASICs, FPGAs, and/or the like), memory 1504, and one or more transceivers 1506 each including one or more transmitters 1508 and one or more receivers 1510 coupled to one or more antennas 1512. The transceiver(s) 1506 includes radio-front end circuitry connected to the antenna(s) 1512 that is configured to condition signals communicated between the antenna(s) 1512 and the processor(s) 1502, as will be appreciated by on of ordinary skill in the art. The processors 1502 are also referred to herein as processing circuitry. The transceivers 1506 are also referred to herein as radio circuitry. In some embodiments, the functionality of the UE 1500 described above may be fully or partially implemented in software that is, e.g., stored in the memory 1504 and executed by the processor(s) 1502. Note that the UE 1500 may include additional components not illustrated in FIG. 15 such as, e.g., one or more user interface components (e.g., an input/output interface including a display, buttons, a touch screen, a microphone, a speaker(s), and/or the like and/or any other components for allowing input of information into the UE 1500 and/or allowing output of information from the UE 1500), a power supply (e.g., a battery and associated power circuitry), etc.

In some embodiments, a computer program including instructions which, when executed by at least one processor, causes the at least one processor to carry out the functionality of the UE 1500 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 16:
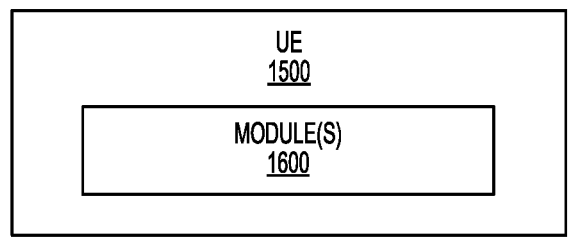

FIG. 16 is a schematic block diagram of the UE 1500 according to some other embodiments of the present disclosure. The UE 1500 includes one or more modules 1600, each of which is implemented in software. The module(s) 1600 provide the functionality of the UE 1500 described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows:

Embodiment 1: A method, performed by a User Equipment, UE, for UE-assisted data collection for mobility prediction, the method comprising: receiving (500, 600), from a telecommunication core network node, a UE trajectory prediction model for predicting a UE trajectory; executing (502, 602) the UE trajectory prediction model to generate a predicted trajectory for the UE; comparing (502, 602) the actual UE trajectory to the predicted UE trajectory; and sending (504, 606), to the telecommunication core network node, a result of the comparison of the actual UE trajectory to the predicted UE trajectory.

Embodiment 2: The method of embodiment 1 wherein sending the result of the comparison of the actual UE trajectory to the predicted UE trajectory comprises sending (504) transition events or trajectory events.

Embodiment 3: The method of embodiment 1 or 2 wherein sending (504) the result of the comparison of the actual UE trajectory to the predicted UE trajectory comprises sending error data that describes a difference between the actual UE trajectory and the predicted UE trajectory.

Embodiment 4: The method of embodiment 2 or 3 further comprising sending the result of the comparison of the actual UE trajectory to the predicted UE trajectory to another UE.

Embodiment 5: The method of embodiment 1 further comprising, subsequent to comparing (602) the actual UE trajectory to the predicted UE trajectory, training or retraining (604) the UE trajectory model.

Embodiment 6: The method of embodiment 5 wherein sending the result of the comparison of the actual UE trajectory to the predicted UE trajectory comprises uploading (606) the trained or retrained UE trajectory model.

Embodiment 7: The method of embodiment 5 or 6 further comprising sending the trained or retrained UE trajectory model to another UE.

Embodiment 8: The method of any of embodiments 1-7 wherein receiving (500, 600) the UE trajectory model from the telecommunication network node comprises receiving the UE trajectory model from a Network Data Analytics Function, NWDAF, and wherein sending (504, 606) the result of the comparison to the telecommunication core network node comprises send the result of the comparison to the NWDAF.

Embodiment 9: A method, performed by a network node, for User Equipment, UE-assisted data collection for mobility prediction, the method comprising: identifying a target UE; downloading (500, 600), to the target UE, a UE trajectory prediction model for predicting a trajectory of the UE; receiving (504, 606), from the target UE, information generated by the UE trajectory prediction model; and using (506, 608) the received trajectory information to train or retrain the UE trajectory prediction model stored in and/or used by the network node.

Embodiment 10: The method of embodiment 9, further comprising updating the UE trajectory prediction model in the target UE.

Embodiment 11: The method of embodiment 10, wherein updating the UE trajectory prediction model in the target UE comprises downloading, to the target UE, the trained or retrained UE trajectory prediction model.

Embodiment 12: The method of embodiment 10, wherein updating the UE trajectory prediction model in the target UE comprises downloading, to the target UE, updated parameters used by the UE trajectory prediction model in the target UE.

Embodiment 13: The method of any of embodiments 9-12, wherein identifying the target UE comprises: receiving a plurality of Radio Base Station, RBS, transition events associated with at least one UE; determining that a RBS transition event of a first UE involved a transition from a first RBS to a second RBS that is not a neighboring pair with the first RBS; identifying the first UE as a target for downloading the UE trajectory prediction model.

Embodiment 14: The method of embodiment 13 wherein identifying the target UE comprises: determining that a RBS transition event of each of a plurality of UEs involved a transition from a first RBS to a second RBS that is not a neighboring pair with the first RBS; identifying the plurality of UEs as potential targets for downloading the UE trajectory prediction model; and selecting, from the plurality of UEs as potential target, a subset of UEs as targets for downloading the UE trajectory prediction model, the subset of UEs including the identified target UE.

Embodiment 15: The method of embodiment 14 wherein the subset of UEs is selected according to a selection algorithm.

Embodiment 16: The method of embodiment 15 wherein the selection algorithm selects the subset of UEs based on: presence of a UE in a region or area where performance is below a threshold, a UE class or type, a UE speed or type of motion, a UE behavior, a UE Radio Access Technology, RAT, or frequency bands supported, and/or a UE battery capacity.

Embodiment 17: The method of any of embodiments 9-16 wherein the network node comprises a Network Data Analytics Function, NWDAF, or an Operations, Administration, and Maintenance, OAM, node.

Embodiment 18: The method of any of embodiments 9-12, wherein identifying the target UE comprises receiving the identity of the target UE from an Operations, Administration, and Management, OAM, node.

Embodiment 19: A method, performed by a network node, for User Equipment, UE-assisted data collection for mobility prediction, the method comprising:
receiving a plurality of Radio Base Station, RBS, transition events associated with at least one UE; determining that a RBS transition event of a first UE involved a transition from a first RBS to a second RBS that is not a neighboring pair with the first RBS; identifying the first UE as a target for downloading the UE trajectory prediction model.

Embodiment 20: The method of embodiment 19 wherein identifying the target UE comprises: determining that a RBS transition event of each of a plurality of UEs involved a transition from a first RBS to a second RBS that is not a neighboring pair with the first RBS; identifying the plurality of UEs as potential targets for downloading the UE trajectory prediction model; and selecting, from the plurality of UEs as potential target, a subset of UEs as targets for downloading the UE trajectory prediction model, the subset of UEs including the identified target UE.

Embodiment 21: The method of embodiment 20 wherein the subset of UEs is selected according to a selection algorithm.

Embodiment 22: The method of embodiment 21 wherein the selection algorithm selects the subset of UEs based on: presence of a UE in a region or area where performance is below a threshold, a UE class or type, a UE speed or type of motion, a UE behavior, a UE Radio Access Technology, RAT, or frequency bands supported, and/or a UE battery capacity.

Embodiment 23: The method of any of embodiments 19-22 wherein the network node comprises a Network Data Analytics Function, NWDAF, or an Operations, Administration, and Maintenance, OAM, node.

Embodiment 24: A User Equipment, UE, (1500) comprising: a transceiver (1506); a processor (1502); and memory (1504) storing instructions executable by the processor, whereby the UE is operable to perform the steps of any of embodiments 1 to 8.

Embodiment 25: A network node (1200), comprising: a network interface (1208); a processor (1502); and memory (1206) storing instructions executable by the processor, whereby the network node is operable to perform the steps of any of embodiments 9 to 23.

Embodiment 26: The network node (1200) of embodiment 25, comprising a Network Data Analytics Function, NWDAF, (900).

Embodiment 27: The NWDAF (900) of embodiment 25, further comprising: a trajectory prediction module (902) that receives User Equipment, UE, Radio Base Station, RBS, transitions and predicts a next RBS for a UE; a gap analysis module (904) that receives the UE RBS transitions; determines that an RBS transition was from a first RBS to a second RBS that is not a neighbor of the first RBS and identifies, based on this determination, a data gap; and generates a list of UEs associated with identified data gaps; and a filter module (906) that filters the list of UEs associated with identified data gaps and produces a list of UEs from which additional data should be collected.

Embodiment 28: A communication system that provides User Equipment, UE-assisted data collection for mobility prediction, the communication system comprising: a Network Data Analytics Function, NWDAF, that downloads, to a target UE, a UE trajectory prediction model for predicting a trajectory of the UE; receives from the target UE, information generated by the UE trajectory prediction model; and uses the received trajectory information to train or retrain the UE trajectory prediction model stored in and/or used by the network node; and a UE that receives, from the NWDAF, the UE trajectory prediction model for predicting a UE trajectory, executes the UE trajectory prediction model to generate a predicted trajectory for the UE; compares the actual UE trajectory to the predicted UE trajectory; and sends, to the NWDAF, a result of the comparison of the actual UE trajectory to the predicted UE trajectory.

Embodiment 29: The communication system of embodiment 28 wherein the NWDAF selects the target UE.

Embodiment 30: The communication system of embodiment 28 further comprising an Operations, Administration, and Management, OAM, node that selects the target UE.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
4G Fourth Generation
5G Fifth Generation
5GC Fifth Generation Core
5GS Fifth Generation System
AF Application Function
AI Artificial Intelligence
AMF Access Management Function
AN Access Network
ASIC Application Specific Integrated Circuit
AUSF Authentication Server Function
CP Control Plane
CPU Central Processing Unit
DN Data Network
DSP Digital Signal Processor
eNB Enhanced or Evolved Node B
EPC Evolved Packet Core
EPS Evolved Packet System
FPGA Field Programmable Gate Array
gNB New Radio Base Station
HSS Home Subscriber Server
IE Information Element
IP Internet Protocol
KPI Key Performance Indicator
LTE Long Term Evolution
MME Mobility Management Entity
MTC Machine Type Communication
NAS Non-Access Stratum
NEF Network Exposure Function
NF Network Function
NR New Radio
NRF Network Function Repository Function
NSSF Network Slice Selection Function
NWDAF Network Data Analytics Function
OAM Operations, Administration, and Maintenance
PCF Policy Control Function
P-GW Packet Data Network Gateway
QoS Quality of Service
RAM Random Access Memory
RAN Radio Access Network
RAU Registration Area Update
RAT Radio Access Technology
RBS Radio Base Station
ROM Read Only Memory
RRC Radio Resource Control
RRH Remote Radio Head
RU Round Trip Time
SCEF Service Capability Exposure Function
SF Service Function
SMF Session Management Function
TA Tracking Area
TAC Tracking Area Code
TAI Tracking Area Identity
TAU Tracking Area Update
TS Technical Specification
UDM Unified Data Management
UE User Equipment
UP User Plane
UPF User Plane Function Those skilled in the art will recognize improvements and modifications to the embodiments of the present disclosure. All such improvements and modifications are considered within the scope of the concepts disclosed herein.

What is claimed is:

1. A method, performed by a User Equipment (UE) for UE-assisted data collection for mobility prediction, the method comprising:
receiving, from a network node of a cellular communications system, a trained UE trajectory prediction model for predicting a UE trajectory;
executing the trained UE trajectory prediction model to generate a predicted trajectory for the UE;
comparing an actual UE trajectory to the predicted trajectory for the UE;
sending, to the network node of the cellular communications system, a result of the comparison of the actual UE trajectory to the predicted trajectory for the UE, and
updating the trained UE trajectory prediction model in a target UE,
wherein updating the trained UE trajectory prediction model in the target UE further comprises downloading, to the target UE, updated parameters used by the trained UE trajectory prediction model in the target UE.

2. The method of claim 1, wherein sending the result of the comparison of the actual UE trajectory to the predicted trajectory of the UE comprises sending transition events or trajectory events.

3. The method of claim 2, further comprising sending the result of the comparison of the actual UE trajectory to the predicted trajectory for the UE to another UE.

4. The method of claim 1, wherein sending the result of the comparison of the actual UE trajectory to the predicted trajectory for the UE comprises sending error data that describes a difference between the actual UE trajectory and the predicted trajectory for the UE.

5. The method of claim 1, further comprising:
subsequent to comparing the actual UE trajectory to the predicted trajectory for the UE, training or retraining the trained UE trajectory prediction model.

6. The method of claim 5, wherein sending the result of the comparison of the actual UE trajectory to the predicted trajectory for the UE comprises uploading the trained or retrained trained UE trajectory prediction model.

7. The method of claim 5, further comprising sending the trained or retrained trained UE trajectory prediction model to another UE.

8. The method of claim 1, wherein receiving the trained UE trajectory prediction model comprises receiving the trained UE trajectory prediction model from a Network Data Analytics Function (NWDAF).

9. The method of claim 1, wherein receiving the trained UE trajectory prediction model comprises receiving the trained UE trajectory prediction model from a Management Data Analytics Function, a Non-Real-Time Intelligent Controller, or a Near-Real-Time Intelligent Controller.

10. The method of claim 1, wherein sending the result of the comparison comprises sending the result of the comparison to a Network Data Analytics Function (NWDAF).

11. The method of claim 1, wherein sending the result of the comparison comprises sending the result of the comparison to a Management Data Analytics Function, a Non-Real-Time Intelligent Controller, or a Near-Real-Time Intelligent Controller.

12. A User Equipment (UE) for UE-assisted data collection for mobility prediction, the UE comprising:

one or more transmitters;
one or more receivers; and
processing circuitry associated with the one or more transmitters and the one or more receivers, the processing circuitry configured to cause the UE to:
  receive, from a network node of a cellular communications system, a trained UE trajectory prediction model for predicting a UE trajectory;
  execute the trained UE trajectory prediction model to generate a predicted trajectory for the UE;
  compare an actual UE trajectory to the predicted trajectory for the UE;
  send, to the network node of the cellular communications system, a result of the comparison of the actual UE trajectory to the predicted trajectory for the UE, and
  updating the trained UE trajectory prediction model in a target UE,
    wherein updating the trained UE trajectory prediction model in the target UE further comprises downloading, to the target UE, updated parameters used by the trained UE trajectory prediction model in the target UE.

13. A method performed by a cellular communications system for User Equipment (UE) assisted data collection for mobility prediction, the method comprising:
  downloading, to a target UE, a trained UE trajectory prediction model for predicting a trajectory of the target UE;
  receiving, from the target UE, information related to training or retraining the trained UE trajectory prediction model;
  using the received information to train or retrain the trained UE trajectory prediction model; and
  updating the trained UE trajectory prediction model in the target UE,
    wherein updating the trained UE trajectory prediction model in the target UE further comprises downloading, to the target UE, updated parameters used by the trained UE trajectory prediction model in the target UE.

14. The method of claim 13, wherein updating the trained UE trajectory prediction model in the target UE comprises downloading, to the target UE, the trained or retrained trained UE trajectory prediction model.

15. The method of claim 13, further comprising:
  prior to downloading the trained UE trajectory prediction model to the target UE, identifying the target UE.

16. The method of claim 15, wherein identifying the target UE comprises:
  receiving a plurality of Radio Base Station (RBS) transition events associated with at least one UE;
  determining that an RBS transition event of a first UE involved a transition from a first RBS to a second RBS that is not a neighbor of the first RBS; and
  identifying the first UE as a target for downloading the trained UE trajectory prediction model.

17. The method of claim 15, wherein identifying the target UE comprises:
  determining that a Radio Base Station (RBS) transition event of each of a plurality of UEs involved a transition from a first RBS to a second RBS that is not a neighbor of the first RBS;
  identifying the plurality of UEs as potential target UEs for downloading respective trained UE trajectory prediction models; and
  selecting a subset of the potential target UEs as target UEs for downloading the respective trained UE trajectory prediction models, the subset of the potential target UEs including the identified target UE.

18. The method of claim 17, wherein selecting the subset of the potential target UEs comprises selecting the subset of the potential target UEs based on at least one parameter.

19. The method of claim 18, wherein the at least one parameter comprises: presence of a UE in a region or area where performance of the trained UE trajectory prediction model is below a threshold, UE class or type, UE speed, type of UE motion, UE behavior, Radio Access Technology (RAT), or frequency bands supported by the UE, and/or UE battery capacity.

20. The method of claim 15, wherein identifying the target UE comprises receiving an identity of the target UE from an Operations, Administration, and Management (OAM) node.

21. The method of claim 13, wherein at least some of the steps of the method are performed by a Network Data Analytics Function (NWDAF) or an Operations, Administration, and Maintenance (OAM) node.

22. A system for User Equipment (UE) assisted data collection for mobility prediction, the system comprising:
  at least one network node for a cellular communications system, the at least one network node adapted to:
    download, to a target UE, a trained UE trajectory prediction model for predicting a trajectory of the target UE;
    receive, from the target UE, information related to training or retraining the trained UE trajectory prediction model;
    use the received information to train or retrain the trained UE trajectory prediction model, and
    update the trained UE trajectory prediction model in the target UE,
      wherein updating the trained UE trajectory prediction model in the target UE further comprises downloading, to the target UE, updated parameters used by the trained UE trajectory prediction model in the target UE.

23. The system of claim 22, wherein each network node of the at least one network node comprises processing circuitry configured to cause the network node to perform at least one of the downloading, receiving, and using.

* * * * *